United States Patent
Mercier et al.

(10) Patent No.: US 7,840,469 B2
(45) Date of Patent: *Nov. 23, 2010

(54) SYSTEM AND METHOD FOR ADMINISTERING A LIFETIME INCOME SHARE PLAN

(75) Inventors: Jonathan L. Mercier, Manchester, CT (US); Ken A. Mccullum, Simsbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 341 days.

This patent is subject to a terminal disclaimer.

(21) Appl. No.: 11/890,005

(22) Filed: Aug. 3, 2007

(65) Prior Publication Data

US 2008/0140586 A1    Jun. 12, 2008

(51) Int. Cl.
*G06Q 40/00*     (2006.01)

(52) U.S. Cl. ............ 705/36 R; 705/35; 705/36 T; 705/38

(58) Field of Classification Search ............ 705/35, 705/36 R, 36 T, 38
See application file for complete search history.

(56) References Cited

U.S. PATENT DOCUMENTS

| | | | |
|---|---|---|---|
| 6,275,807 B1 * | 8/2001 | Schirripa | 705/36 R |
| 7,249,077 B2 | 7/2007 | Williams | |
| 7,376,608 B1 * | 5/2008 | Dellinger et al. | 705/36 R |
| 2004/0177022 A1 | 9/2004 | Williams | |
| 2004/0267651 A1 * | 12/2004 | Jenson et al. | 705/36 |
| 2005/0234821 A1 * | 10/2005 | Benham et al. | 705/40 |
| 2005/0256748 A1 | 11/2005 | Gore et al. | |
| 2006/0085338 A1 * | 4/2006 | Stiff et al. | 705/40 |
| 2006/0212380 A1 | 9/2006 | Williams | |

OTHER PUBLICATIONS

Anthony H Riccardi, & Thomas R Ireland. (2002). A Primer on Annuity Contracts, Structured Settlements, and Periodic-Payment Judgements. Journal of Legal Economics, 12(3), 1-46. Retrieved Jul. 15, 2010, from ABI/INFORM Global. (Document ID: 805466031).*
Sally Law. (Mar. 2006). Is It Better to Give Than to Receive? USBanker, 116(3), 49. Retrieved Jul. 15, 2010, from ABI/INFORM Global. (Document ID: 1001244281).*
Long, B.. (Jan. 2004). Solving the Other Half of the Retirement Equation. Life Insurance Selling: Review & Outlook 2004,30,32,34-35. Retrieved Jul. 15, 2010, from Banking Information Source. (Document ID: 1480935461).*

* cited by examiner

*Primary Examiner*—Alexander Kalinowski
*Assistant Examiner*—Muriel Tinkler
(74) *Attorney, Agent, or Firm*—Howard IP Law Group, PC

(57) ABSTRACT

The present invention provides a system and method for administering an investment option known as a lifetime income share. Lifetime income shares mitigate survival risk, the risk that an individual will outlive his or her assets. More specifically, the purchase of a plurality of lifetime income shares guarantees an individual a predetermined, periodic income payment for the life of the purchaser. The guaranteed stream of monthly income commences at a specified age. Furthermore, the guaranteed stream is utilized to supplement an existing income level or provide income in the event that the individual outlives his or her accumulated liquid assets.

68 Claims, 17 Drawing Sheets

SYSTEM AND METHOD FOR ADMINISTERING A LIFETIME INCOME SHARE PLAN

CROSS-REFERENCE TO RELATED APPLICATION

This application claims priority to U.S. Utility application Ser. No. 11/724,839, filed Mar. 16, 2007, which claims priority to U.S. Provisional Application Ser. No. 60/785,141, filed Mar. 23, 2006, the contents of the entire chain of applications which led to the present application are herein incorporated by reference.

FIELD OF THE INVENTION

The present invention generally relates to the field of insurance. More specifically, the present invention discloses a novel deferred annuity investment option which guarantees an individual a predetermined income starting at a specified time in the future. The annuity, or plan known as a "lifetime income share," provides a fixed income to a purchaser beginning at a predetermined period of time and continuing throughout the purchaser's life, thereby mitigating survival risk.

BACKGROUND OF THE INVENTION

One of the distinguishing characteristics of human beings from other species is their ability to think and plan ahead. Nevertheless, many people have great trouble preparing for long term future events such as retirement.

Thinking and acting on thoughts in advance are keys to preparing for the future when it turns inexorably into the present. The younger a person is, the more time he or she has to plan for retirement. In addition, earlier planning and investing provides an individual with more flexibility and a greater probability of an increased "nest egg" because many investments provide compound returns over time.

Most individuals work at least 40 years with the goal of retiring at 65. After retiring, a typical individual utilizes a predetermined percentage of his or her accumulated assets each year to maintain the lifestyle to which he or she is accustomed. Generally, the individual no longer works to increase the sum total of assets. Thus, the individual's income sources are limited to investments and government support, if applicable. In addition, the average life expectancy for a male reaching age 65 is currently approximately 85, and has increased significantly over the last 10 years. As a result of all of those factors, there is a substantial risk that an individual may expend the sum total of his or her accumulated assets before passing away, leaving the individual without independent financial support. This "survival risk" can greatly complicate the financial planning process for individuals approaching retirement. The purchase of lifetime retirement income can assist in the management of survival risk. The invention described below, inter alia, significantly simplifies the process of purchasing retirement income over time.

Accordingly, retirement planning consists of more than picking an age to retire and a beachfront property on which to retire. In stark contrast, retirement planning requires analysis of an individual's lifestyle, resources, and a myriad of other factors that are often taken for granted while an individual is working. Most of these factors relate to financial issues.

A particularly valuable tool used in retirement planning is the use of retirement plans. Many mid-size and large employers offer various retirement plans to their employees. Indeed, many have two or more. There are several types of retirement plans.

With respect to one such retirement plan, a "defined benefit plan" or a "company pension," employers typically fund a pension account with or without any financial contributions from the employees. An employee's final retirement income benefit (i.e., periodic income payment received for life upon retiring) is determined by a formula often based on years of service, an average wage, and a percent of pay.

For example, the plan could set a final benefit of a "joint and 50% annuity calculated as 1.5% times years of credited service times the average of an individual's last three years' base annual wage." With 30 years of service, at retirement a pension can replace roughly 45% of an individual's final annual wage. Under the typical defined benefits plan, the survival risk, as well as all investment risk, is assumed by the employer. Generally, this risk is substantially mitigated by pooling it over a large number of retirees.

Defined benefit plans have developed several optional policies and tools to fund the employer's obligation. One such early tool, first used over 50 years ago, is known as a group deferred income annuity. An employer purchasing a group deferred income annuity contract makes periodic payments to an insurance company, which applies these payments to the purchase of deferred annuities for covered workers. The purchase price is specified by the employer's contract with the insurance company. As a result, the insurer indemnifies the employer against changes in rates of return, mortality risk, or other factors that could alter the funding costs of the defined benefit plan. In short, the group deferred income annuity transfers the survival risk and the investment loss from the employer to the insurance company.

Over the years, employers have moved to other approaches to funding their defined benefit plans. These approaches emphasized flexibility over guarantees. In particular, these approaches allowed employers to defer funding their pension obligations, leading to a significant number of under funded defined benefit plans. This, along with other factors, caused defined benefit plans to lose favor among employers.

Increasingly, defined benefit plans are no longer being provided by many employers. This is part of a long-term trend, which virtually all experts agree will continue, and may even accelerate. As a result, defined benefit plans are either unavailable, or, when available, do not provide income levels that adequately alleviate an individual's survival risk or the mortality risk associated with a group, such as the employees of an employer.

Notwithstanding the disfavor among employers, defined benefit plans in general, and group deferred income annuities in particular, continue to have substantial benefits to individual employees. This is because they assure a constant stream of lifetime income, which allows an individual to better plan for their future income requirements in retirement.

Another type of retirement plan typically offered by employers, a "defined contribution plan," provides an individual account for each participant. The benefits (i.e., the amount available to the employee in retirement) are based on the amount of funds contributed to the individual's account and are affected by such factors as income, expenses, gains, and losses. Some examples of defined contribution plans include 401(k) plans, 403(b) plans, 457 plans, employee stock ownership plans, and profit sharing plans.

Often, an employer will make contributions to an employee's account in addition to an individual's contribution. While these contributions vary by employer, employers typically match an individual's contribution from 50% to 100% up to 6% of an individual's pay. In short, if an individual contributes 6% of his or her paycheck to the retirement account, an employer contributes between 3% and 6% as well. Although defined contribution plans have certain advantages, they place virtually all of the survival risk and all of the investment risk on the employee. The typical defined contribution plan does not provide an efficient means of purchasing a dependable lifetime income stream or converting the accumulated assets into such a dependable stream. As a result, defined contribution plans are largely ineffective as a vehicle for permitting participating individuals to reduce the survival risk inherent in a person's retirement.

Current defined contribution retirement plans have limited or no success in incorporating the benefits to individual employees associated with a defined benefit plan. In particular, the benefit of a known, guaranteed lifetime retirement income is generally not available under any defined contribution plans. Accordingly, there is a clear need in the art for an investment facility that efficiently combines the benefits and flexibility of a defined contribution plan and the security of a guaranteed monthly retirement income. The present invention, inter alia, adapts the high level of retirement income security provided by a group deferred annuity to the complexities of modern defined contribution plan recordkeeping, with their multiple complex investment choices.

While most individuals have access to defined contribution plans, not all do. Furthermore, not all defined contribution plans can be expected to offer lifetime income shares. In many situations, individuals will need to use tax qualified Individual Retirement Accounts ("IRAs"), tax qualified individual retirement annuities or personal savings to plan for their retirement. Thus the invention, lifetime income shares, will also be made available, in an individual or group policy version, that can be purchased separately or as an investment vehicle on the recordkeeping platform of a particular IRA provider.

Because current retirement plans and programs typically do not provide participants with effective tools to mitigate their individual survival risk, there is a clear need in the art for a system and method to more effectively manage the risk associated with outliving one's accumulated assets. The present invention overcomes the various deficiencies associated with traditional survival risk management techniques by creating a novel system and method that allows an individual employee to elect an "investment option" in a defined contribution plan or through an IRA provider that is known as a "lifetime income share." Rather than having an investment account balance, the employee accumulates shares that guarantee him a precise amount of monthly lifetime retirement income, guaranteed for life, starting at age 65.

SUMMARY OF THE INVENTION

The present invention comprises a fixed deferred annuity that provides a guaranteed lifetime monthly income within the context of a defined contribution plan or similar investment savings program, using the vehicle of a lifetime income share. The lifetime income share allows a participant or other individual to receive the survival risk management and dollar cost averaging benefits associated with a guaranteed retirement income annuity in the context of a defined contribution plan or similar record keeping platform, such as that of an IRA provider.

The lifetime income shares can be offered as an option in an employer sponsored defined contribution plan (qualified or non-qualified) or as a stand alone investment feature, through an IRA or similar tax qualified or non-tax qualified investment savings vehicle. Lifetime income shares are designed to be readily integrated into a defined contribution plan, and allow easy access of information between the insurance company, the plan record keeper, the employer and the purchasing annuitant.

The lifetime income share could also be used to fund some or all of an employer's obligation under a "cash balance plan (which combines the features of defined benefit and defined contribution plans) or under a traditional qualified or non-qualified defined benefit plan.

Unlike both traditional individual deferred annuities and typical defined contribution plans, the lifetime income share preferably has no account balance. Advantageously, it provides an easy and effective means for an individual to purchase a guaranteed lifetime retirement income in frequent, small purchases, typically via payroll deduction through his or her employer's defined contribution plan or similar recordkeeping platform. Fractional share units may be purchased, which, in turn, may represent fractional "cents" of monthly lifetime income. Accordingly, there is no practical limit on how small an individual purchase may be.

Frequent purchases over an extended period of time also help mitigate the investment risk implicit in the purchase of a single premium annuity at retirement. If available interest rates are abnormally low at retirement, when such a purchase is made, the resultant periodic retirement income amount will be substantially reduced. By spreading purchases over an extended period of years, the risk associated with abnormally low investment earnings rates at point of purchase is substantially mitigated.

The present invention also comprises a method of offering a lifetime income share. The method preferably comprises determining multiple age (and gender) based lifetime income share prices, communicating these prices on a daily (or less frequent) basis to the plan or other providers' record keeping system(s), and applying the lifetime income share prices to purchase the appropriate number of shares for each contributing participant, based on that participant's age and, in some cases, gender. Each share preferably utilizes a standardized annuity payment form, with a uniform age-based income start date. Participants can preferably elect alternative annuity payment forms or income start dates only at the time they choose to start receiving periodic retirement income payments. Any death benefit prior to income start date, including, in some iterations a spousal or survival annuity, is also standardized.

Lifetime income shares are preferably offered to plan participants through each of the communications media used by the plan's record keeper (e.g., print, phone, Internet, etc.) A participant can preferably elect to purchase lifetime income shares through periodic plan contributions or through a transfer of funds from another plan investment option. All transactions are preferably processed automatically through the plan's record keeping system by applying the appropriate age-based share price to the available funds.

On the income start date, the offeror begins to disburse lifetime income payments as dictated by the terms of each share. The amount is adjusted to reflect the actual start date by applying an actuarial adjustment factor. That factor is calculated using a principal based methodology, based on current pricing methods and assumptions, rather than by using a static factor table. Payments continue for the life of the applicant.

Further, as of the income start date or similar non-selectable dates (e.g., the death of the annuitant) the income payments can be made payable on the life of another individual (e.g., a spouse or other named natural person beneficiary). It also can be made payable on multiple lives (e.g., a joint and survivor annuity).

Further, it can incorporate any form of death benefit normally utilized currently in connection with single premium annuity purchases (e.g., period certain; cash refund; etc.).

The present invention also comprises a system and method for administering an income share plan including an annuity platform including one or more communication modules and a processing module, wherein the annuity platform receives and transmits information to and from a plan provider and a record keeper.

The annuity platform further includes a data storage module for storing information associated with the income share plan, a display module, a data entry module, and a calculation module. The plan provider's platform further includes a data storage module for storing information associated with the income share plan, a display module, a data entry module, and a calculation module.

The system and method further includes the steps of providing the plan to a plan participant by a plan provider, keeping records by a record keeper, interfacing the plan provider and the record keeper using an annuity platform, providing a means for the plan provider to process and transmit information via a plan provider's platform, providing a means for the record keeper to process and transmit information via a record keeper's platform, and providing a means for the annuity platform to process and transmit information.

In light of the foregoing, it is an object of the present invention to provide participants/annuitants with a useful means to mitigate their personal survival risk.

Further, it is an object of the present invention to provide a financial retirement planning tool(s) that permit an individual to currently mitigate their survival risk through advance planning. Such tools will, among other things:

Allow a participant to determine the dollar amount he needs to apply, using current age based share prices, to meet specified lifetime retirement income goals;
  Allow a participant to determine the lump sum amount needed, using current age based share prices, to purchase a specified supplemental amount of retirement income;
  Allow a participant to determine the plan contribution rate needed, using current age based share prices, to meet specified lifetime retirement income goals; and
  Adjust the above calculations to reflect other additional assumptions, such as anticipated rate of salary or wage rate increases.
  Provide a basis for a reasonable comparison of an investment in income shares to comparable investment options (i.e., long term bond funds, stable value funds, etc.)

Yet another object of the present invention is to provide an annuity which reduces the risks associated with survival.

Still another object of the present invention is to provide a method whereby an individual reduces his or her risks associated with survival.

It is also an object of the present invention to provide for the purchase of periodic income benefits over time through payroll deduction and/or inter-fund transfers.

Another object of the present invention is to provide for multiple payout options, including single life and joint and survivor.

Still another object of the present invention is to offer a death benefit that allows the lifetime income guarantee to be optimally transferred to another measuring life, such as a spouse or other natural person.

Still another object of the present invention is to offer a full range of traditional annuity death benefits, such as a full cash refund payout option.

Still yet another object of the present invention is to provide a fixed deferred payout annuity that provides guaranteed lifetime income.

It is an object of the present invention to have an annuity platform that is readily available.

Another object of the present invention is to have the annuity platform be easily accessible.

Yet another object of the present invention is to have the annuity platform provide a mature quality control support structure, as well a mature quality production control support structure.

It is also an object of the present invention to have the annuity platform contain reliable and tested business recovery procedures.

Additionally, an object of the present invention is to have the annuity platform be scalable for future transaction volumes, as record keeper agreements increase the annuity platform will be able to process significant amounts of periodic (e.g. daily, weekly, monthly, etc.) batch transactions with multiple external platforms.

Another object of the present invention is to minimize the costs incurred by the provider of the Lifetime Income Share Plan as a result of the record keeping aspects of the present invention.

Yet another object of the present invention is to provide a scalable and reusable platform for the implementation of the present invention.

Furthermore, it is an object of the present invention for the annuity platform to have real-time web access with platform capable of being 'linked' to and from other external sites.

It is also an object of the present invention for the annuity platform to have a relational data store, for plan and participant data, with potential accessibility from other external applications.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

FIGS. 1-5 are screen shots depicting the process of estimating future lifetime income in accordance with the preferred embodiment of the present invention.

FIGS. 7-8 are screen shots depicting the process of determining an individual's future lifetime income in accordance with the preferred embodiment of the present invention.

DETAILED DESCRIPTION OF THE PREFERRED EMBODIMENT

Figure 1:
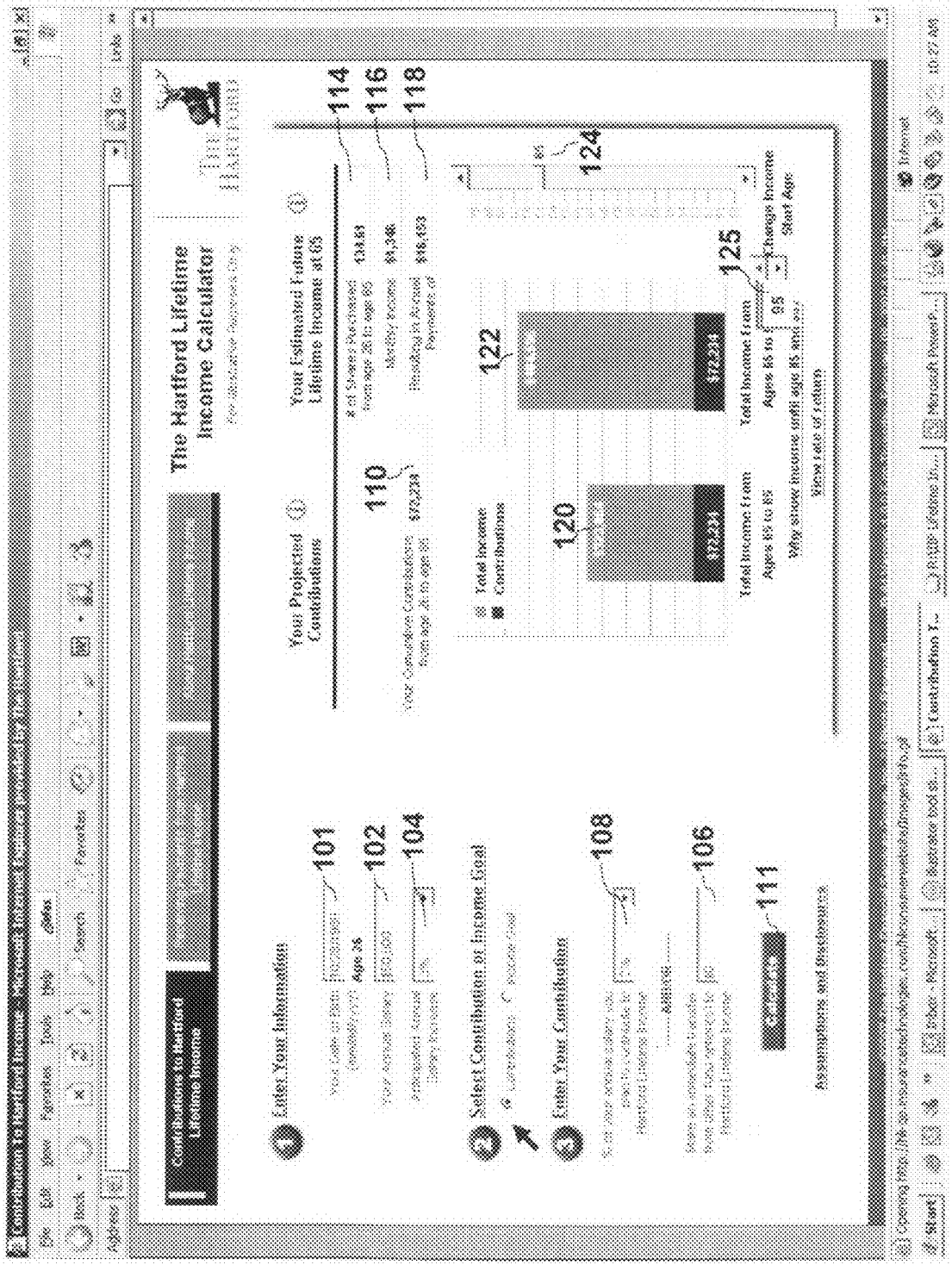
Figure 2:
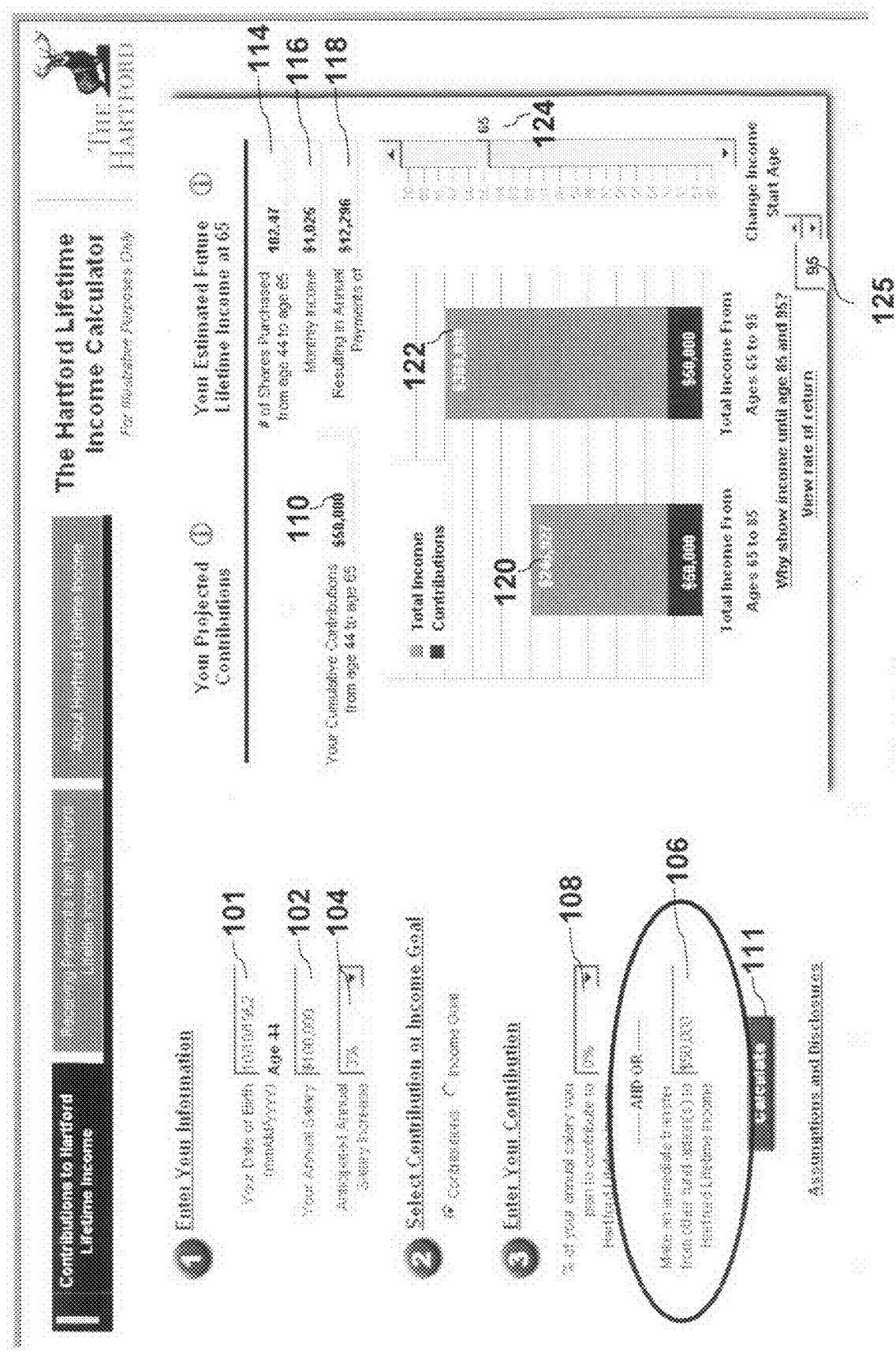
Figure 3:
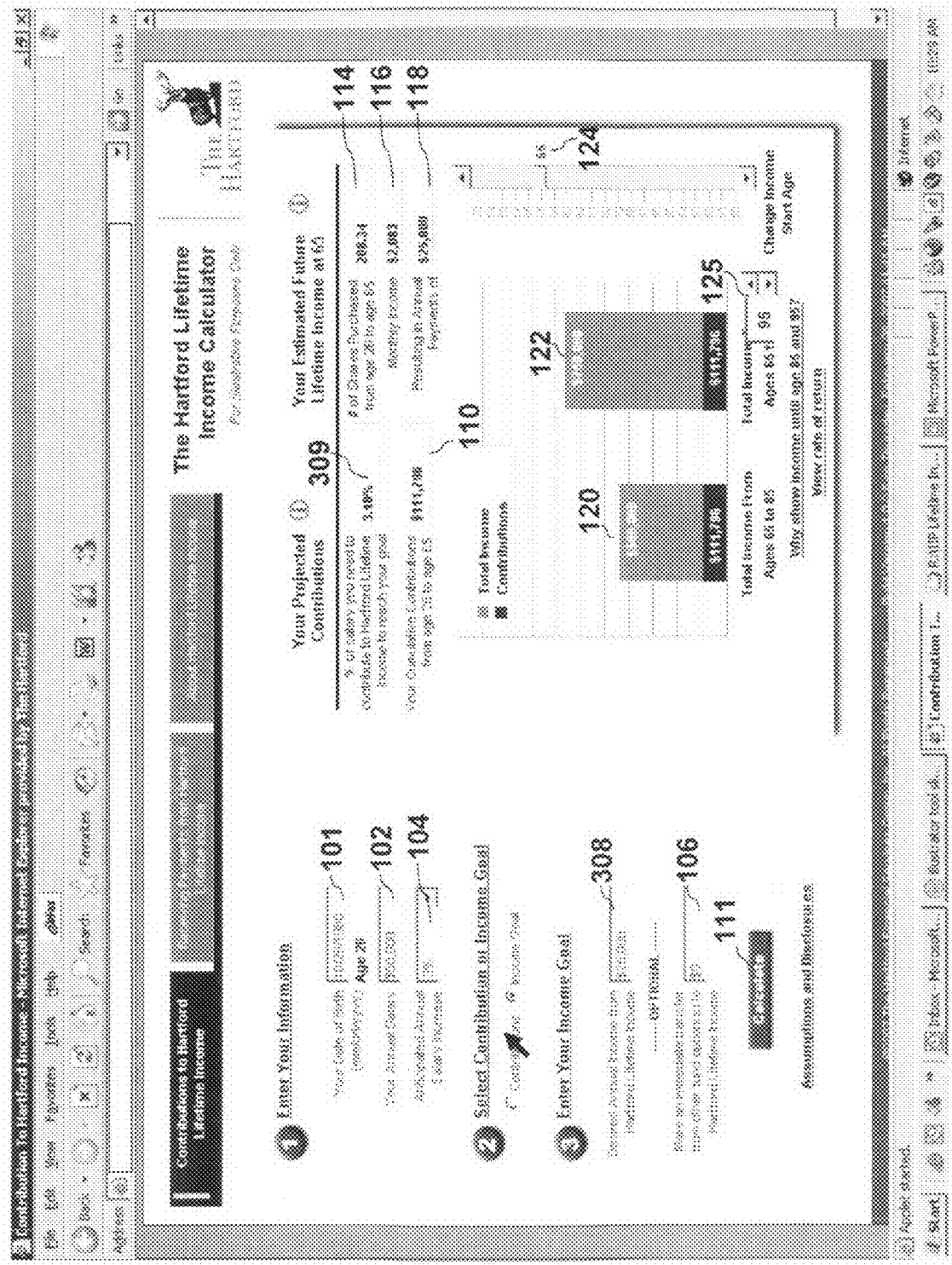
Figure 6:
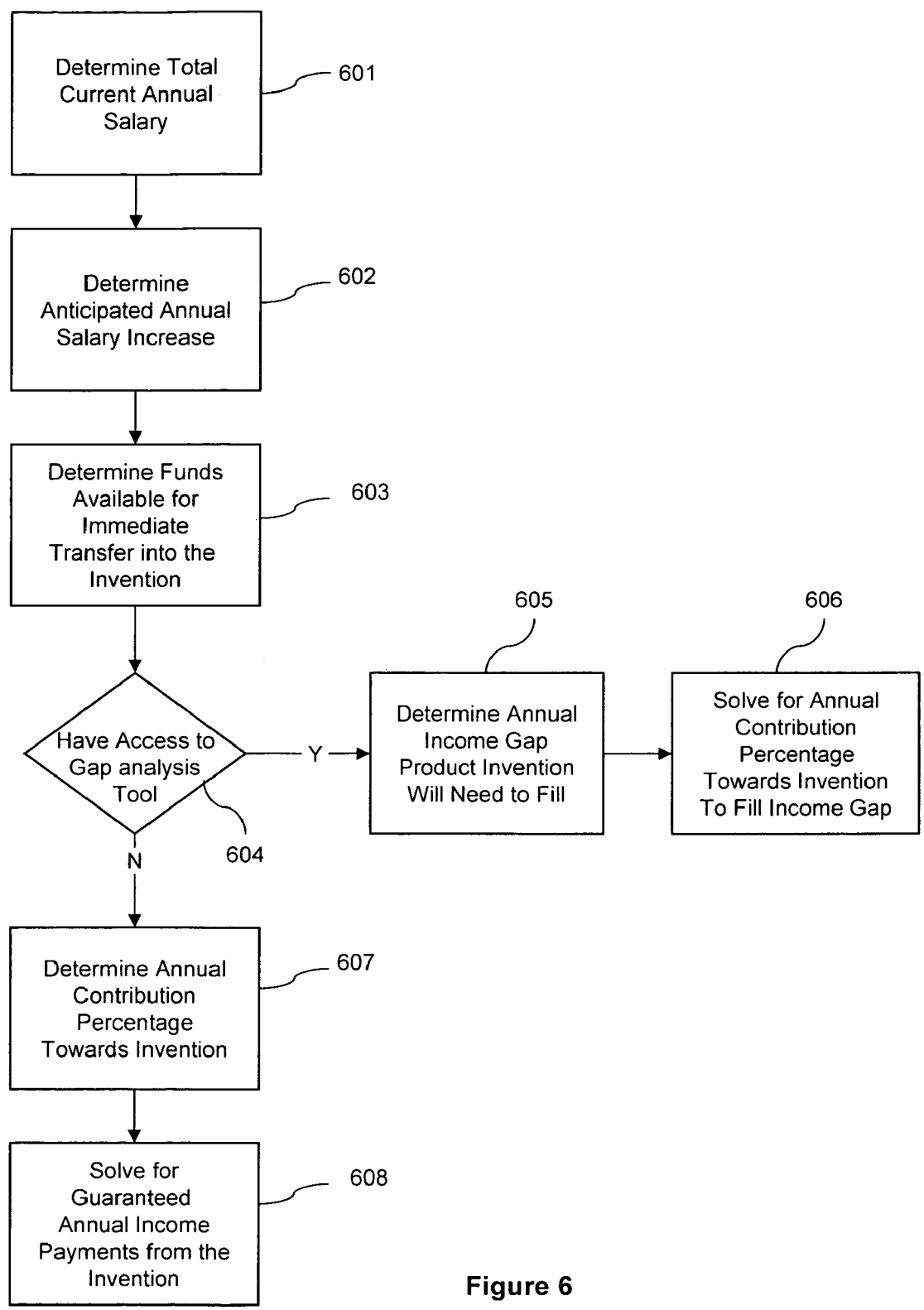
FIG. 6 is a flow chart depicting the process of estimating future lifetime income in accordance with the preferred embodiment of the present invention.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Description of Income Shares Functionality

The preferred embodiment of the present invention allows for the single, infrequent or frequent and potentially very small purchases of future guaranteed income increments, by a single or large number of individuals, through a vehicle or plan (e.g., a financial institution's defined contribution plan or IRA recordkeeping system) designed to track more traditional, accumulation focused investment products.

Numerous accommodations are preferably made to accommodate the unique characteristics of lifetime income shares. These include, but are not limited to:

Maintaining separate price files for each age gradation, with the possibility of separate prices for each gender;

Maintaining multiple values for distinct transaction types (e.g., death benefit, surrender or transfer benefit, income amount, etc.);

Provide income planning tools designed to estimate the impact of current or continuing share purchase levels on the level of guaranteed lifetime retirement income an individual can be assured of receiving;

Providing for adjusted benefit quotation and election capabilities over a wide range of ages and benefit types;

A process for allowing the income share provider to assume certain plan compliance functionality associated with plan provided lifetime benefits;

Establishing and maintaining adequate insurance regulatory reserves;

A process for determining, verifying and reconciling participant age data;

A process for complying with regulatory and reporting requirements applicable to both the income share provider and the plan; and Meeting the specific distribution needs of participating plans and programs (e.g. Forfeitures and corrective distributions).

In addition, the present invention has the inherent flexibility to adapt to the unique characteristics of existing requirements of the various organizations that provide recordkeeping services to employer defined contribution plans or to various financial institutions and service partners that provide such services or offer IRA products.

To accomplish this result, each purchase preferably is made through a uniform "Lifetime Income Share." A "share" or plan is defined as a unit of periodic income on a single life starting at a specific age or date. The shares may be purchased through periodic contributions, aperiodic contributions, or a lump-sum contribution. The income may also be aperiodic or a lump sum, although, in the preferred embodiment, the income is periodic. For example, in the preferred embodiment, a share is defined as equaling $10 of monthly lifetime retirement income starting when the purchaser reaches age 65 (or another defined age). A critical concept is that all purchases for a defined group are preferably made on the identical basis, thereby facilitating the large number of potential transactions contemplated by the invention. Of course, a lifetime income share can be designed such that the retirement income can be any amount. Further, the start age of the annuity or other payments can be altered to any age as is known in the art.

The use of a single unique share definition for purchases does not result in a need to impose any limiting requirements that the income be actually received in accordance with the definition. The participant or annuitant continues to have substantial flexibility as to when and in what form income is actually taken.

This is preferably accomplished through the use of a discrete set of actuarial adjustment factors developed using a principal based methodology, where the actuarial adjustment factors are calculated based on current pricing methods and assumptions, rather than by using a static factor table. These factors may be available to the record keeper and/or participant or annuitant through an automated illustration tool and can be applied at or before the point an individual participant or annuitant chooses to receive periodic income. These factors may also be available through a separate or integrated quoting tool intended to provide an actionable benefit quotation at the point the participant or annuitant is electing to receive income. These tools are able to determine the income value of each share, as adjusted to primarily reflect some or all of the following effects:

- Taking income at a younger age than the age specified in the share definition;
- Taking income at an older age than the age specified in the share definition;
- Taking income in a benefit form (e.g., an annuity on two lives) other than that specified in the share definition;
- Taking income in a benefit form with a death benefit other than that specified in the share definition;
- Age verification procedures, through the use of publicly available electronic databases (e.g., Social Security data files);
- Taking income at a frequency (e.g., quarterly) other than that specified in the share definition;
- Future increases in periodic income amounts, intended to off-set the impact of inflation on real retirement income; and
- Making any other adjustment typically made in conjunction with commercial immediate income annuities.

The price of a lifetime income share may vary as frequently as daily, or less frequent pricing (e.g., weekly) may be used. The price of a lifetime income share preferably varies with the age of a participant. It may also vary with other factors, including, for example, a participant's gender. Typically, there will be a separate and distinct price for each age at which shares can be purchased (e.g., 20 years old to 70 years old). The age used may be based on one or more of the traditional bases common in the insurance industry (e.g., age of last birthday). However, in the preferred embodiment of the invention age is determined on a calendar year basis (e.g., age on January 1 of each year). Advantageously, this allows adjustments to all ages of all participants or annuitants to be made once per year, on a single date, thus greatly simplifying the recordkeeping process for an age sensitive product. For example, a Committee on Uniform Security Identification Procedures-like ("CUSIP-like") number or similar generic alpha and/or numeric designator could be assigned to a single share class for all individuals of the same gender born in a single calendar year. All shares purchased by that class of individuals would always have the same number.

Premium payments (i.e., the price of a share) can be paid in a single sum. Alternatively, premium payments can be paid in periodic installments (e.g., bi-weekly monthly, etc); to match the pay and plan contribution cycle of the employer sponsoring a defined contribution plan or to reflect automated withdrawals from an individual's bank or investment account. One of ordinary skill in the art will readily appreciated that flexible premium payments may also be utilized.

Advantageously, the premium required to purchase future income can be very small because of the efficiencies of utilizing the capabilities of the existing plan record keeping system. Investment returns during the potentially long deferral period allow the provider of the present invention to provide a higher income benefit at the income start date. These income benefits may be further enhanced by mortality gains that the surviving individuals enjoy. This aspect of the invention may be enhanced by the imposition of limits on share liquidity, including, but not limited to, the impositions of a prudent mortality/investment risk anti-selection charge or, even, the absence of any liquidity.

Several additional features are preferably included in the preferred embodiment of the invention, especially when used in conjunction with an employer's defined contribution plan. These features are designed to fully incorporate the offering of lifetime income shares into the daily operations of the defined contribution plan on similar system.

The price base for current purchases of lifetime income shares is expressed in a manner that permits comparison to other available investment choices (e.g., "Price implies the return of 10 year Treasury Security, plus 65 basis points assuming death at age 85"). This basis could be tailored to reflect the pricing for specific age or specific age groups.

The periodic statements provided to individuals preferably reflect the actual periodic shares purchased both for the actual statement period and the total monthly income purchased to date and the amount of periodic income they reflect. Advantageously, this distinguishes the unique characteristics of lifetime income shares as compared to the other investment choices available under the plan or program.

Lifetime income shares may have reduced, or limited liquidity, as compared to the very high liquidity level afforded by comparable investments available through employer defined contribution plans and similar programs. As described earlier, this feature can provide a significantly enhanced investment return and additional investment diversification benefits to the individual participants. These benefits are generally not available through most traditional investments available through defined contribution plans or IRAs.

Where liquidity is provided, a uniform bid/asked spread is preferably imposed. By compensating the lifetime income share provider for mortality and other anti-selection risks, it helps control the share price, thus maximizing the income that can be purchased and improving the competitive value of the invention in the marketplace.

The liquidity amount is preferably determined by a reverse purchase transaction. That is, the amount paid for redeemed shares is the amount the lifetime income share provider would have charged that individual to purchase identical shares, less any investment risk and/or mortality anti-selection spread. By using this approach, the present invention avoids the need to maintain any account balance. Furthermore, this also simplifies maintenance and avoids the need for any explicit guaranteed investment rates, or market value adjustment formulas or similar features, commonly associated with other guaranteed annuity products.

In the preferred embodiment of the present invention, individuals may be absolutely guaranteed that they or their heirs will always receive the full amount actually used to purchase lifetime income shares, less any amounts received by the participant/annuitant.

Description of Recordkeeping Models

Initially, a potential provider of lifetime income shares (i.e., a financial institution or plan record-keeper) may decide to provide lifetime income shares to the employer plans or other customers using either of two basic models of the present invention: the "Insurer Calculate" transaction model and the "Recordkeeper Calculate" transaction model.

Under both models, a participant/annuitant is preferably provided with the opportunity to purchase a lifetime income share as part of a portfolio of investment options in a defined contribution plan, such as a 401(k) plan. For example, a participant's employer can introduce a retirement plan with this feature. Alternatively, the benefits provider of an existing retirement plan can add this feature to an existing plan. One of ordinary skill in the art will readily appreciate that any other provider or entity can provide information related to lifetime income shares. Information sources include the internet, direct advertising brochures, other marketing materials, or any other means of making information available to a potential participant.

In the preferred embodiment of the present invention, a participant can access information related to lifetime income shares via an online platform as shown in FIGS. 1-5. For example, a participant can access a lifetime income share calculator as shown in FIGS. 1-5.

Referring to FIGS. 1-6, shown is the method for using the share calculator. In step 601 of FIG. 6, after entering their date of birth into field 101 of FIGS. 1-5 to determine the participant's age, an participant would need to determine the total current annual salary the participant is receiving. This information is then input into field 102 of FIGS. 1-5. Then, in step 602, an participant would enter their average anticipated annual salary increase they expect to receive over the period they plan to invest prior to retirement. This information is then input into field 104 of FIGS. 1-5. Then, in step 603, a participant would enter the amount of funds the participant believes they will immediately transfer. This information is then input into field 106 of FIGS. 1-5.

The user then presses the calculate button 111 and the total contributions are shown in field 110. The monthly income is shown in field 116 and the annual income is shown in field 118. The number of shares purchased is shown in field 114. A graph showing the total income and contributions from ages 65-85 is shown at 120, and a graph showing the total income and contributions from ages 65-95 is shown at 122. The participant can use the drop down 125 to increase or decrease life expectancy. The participant also would indicate the age that the participant wishes the income to start using the slider 124.

Then, in step 604, it is determined whether the participant has access to a gap analysis tool. If the participant does have access to a gap analysis tool, then in step 605, it is determined the annual income gap product that will need to be filled. The gap determined is then input into field 308 of FIG. 3. Then, in step 606, the annual percentage that the participant would need to contribute is determined to fill a specific retirement income gap at a specific retirement age is shown in field 309.

Figure 4:
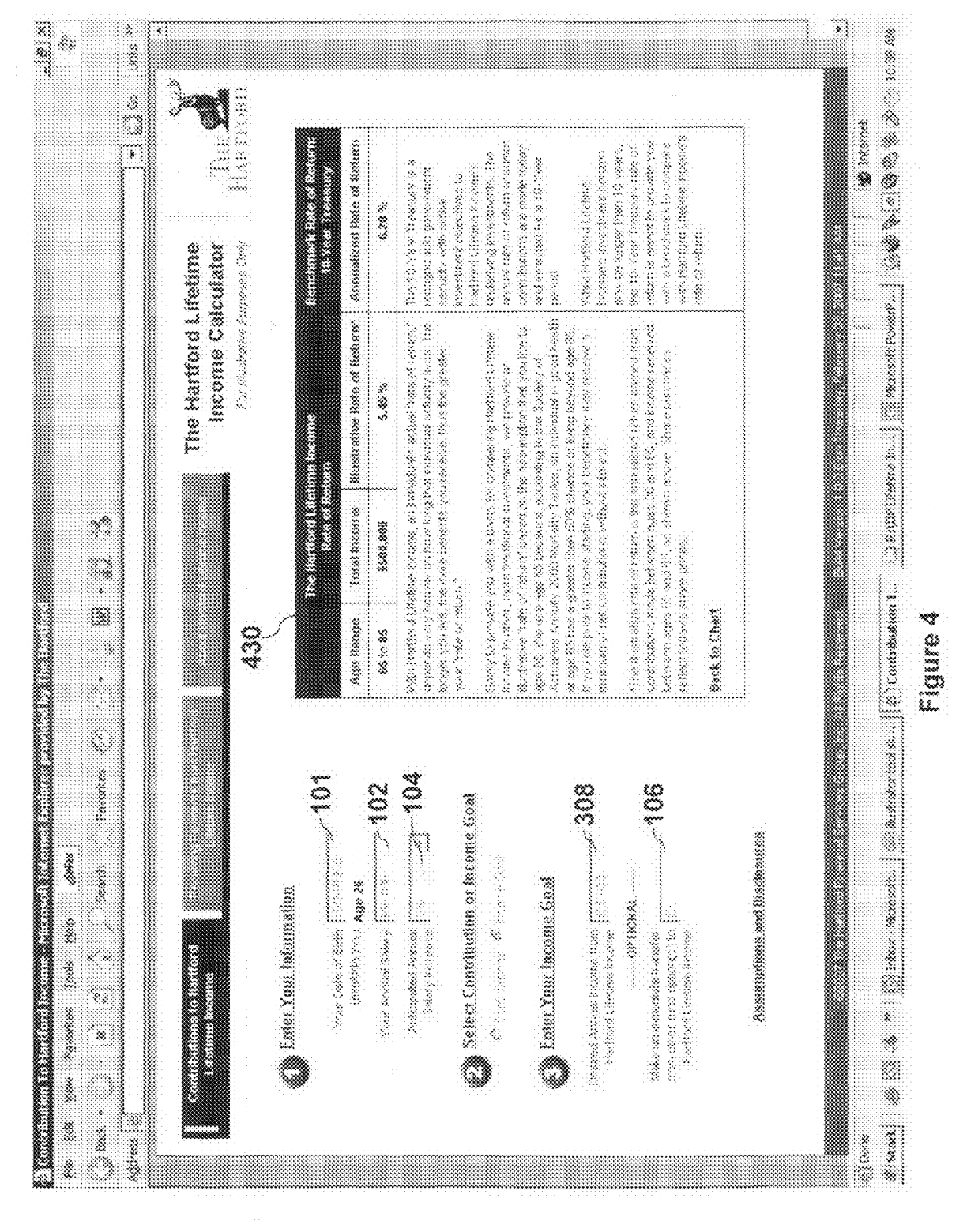
Figure 5:
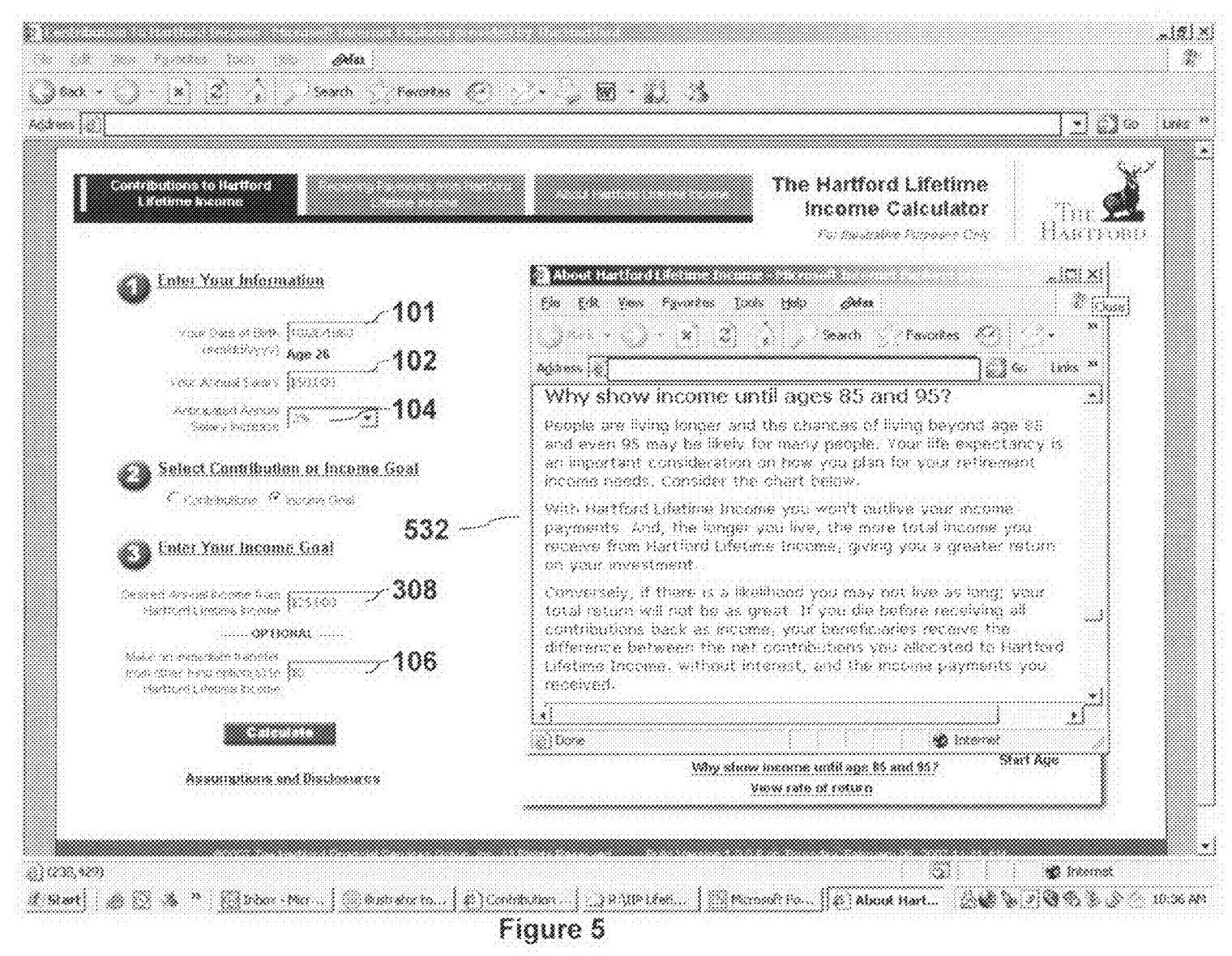

In field 430, FIG. 4, there is shown an explanation of the "rate of return." In field 532, FIG. 5, there is shown a description of why the incomes are shown until ages 85 and 95.

If, in step 604, it is determined that the participant does not have access to a gap analysis tool, then in step 607, the total annual income the participant would receive at a specific retirement age is determined based on a annual contribution.

This contribution is input as a percentage in field 108. Output is based on the assumption that future share prices are the same as current prices.

Therefore, after entering variables such as age and hypothetical contribution amount, the lifetime income share calculator preferably displays the number of share(s) and the age benefit payout purchased by the hypothetical contribution to the potential participant.

Figure 7:
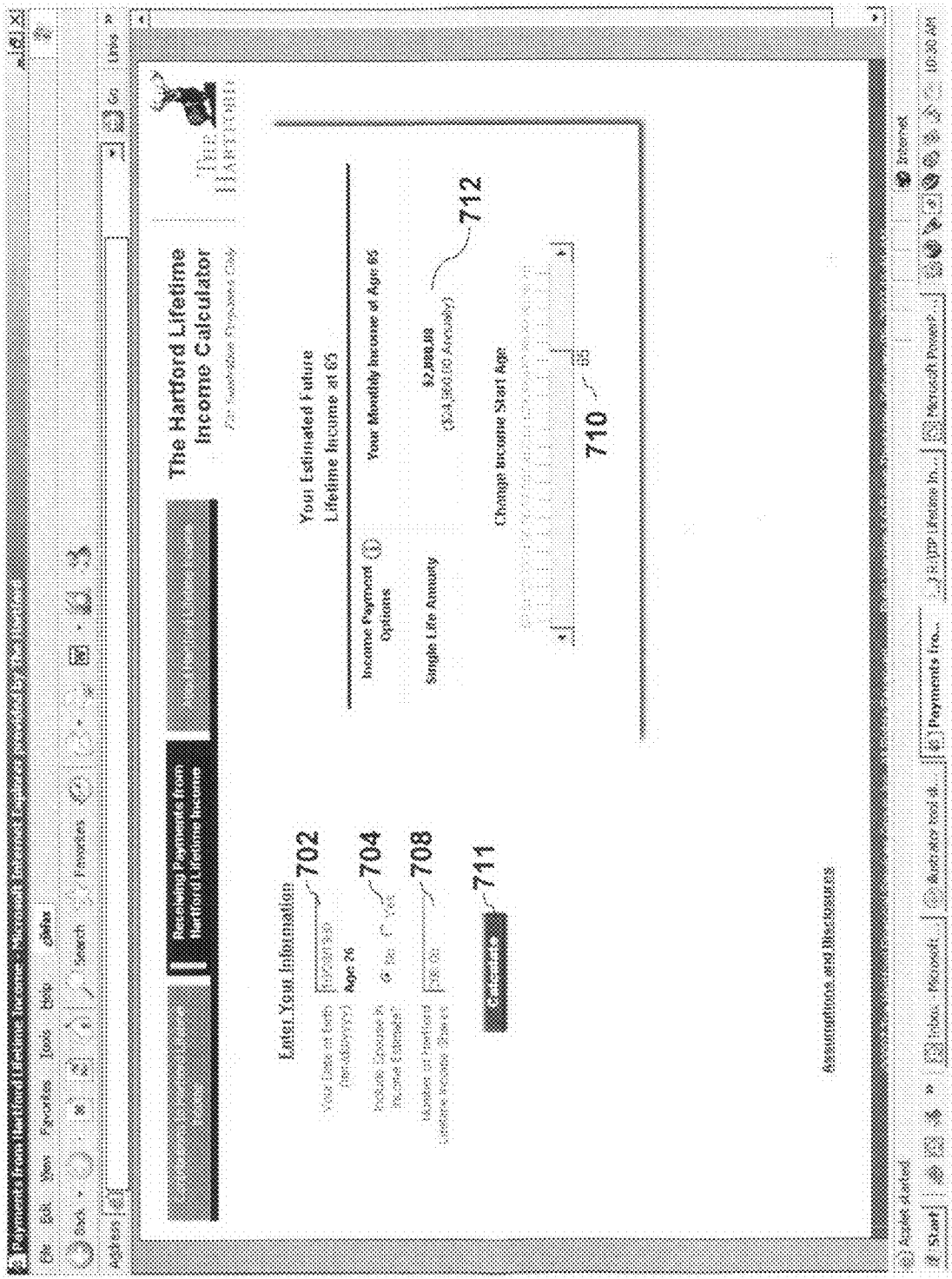
Figure 8:
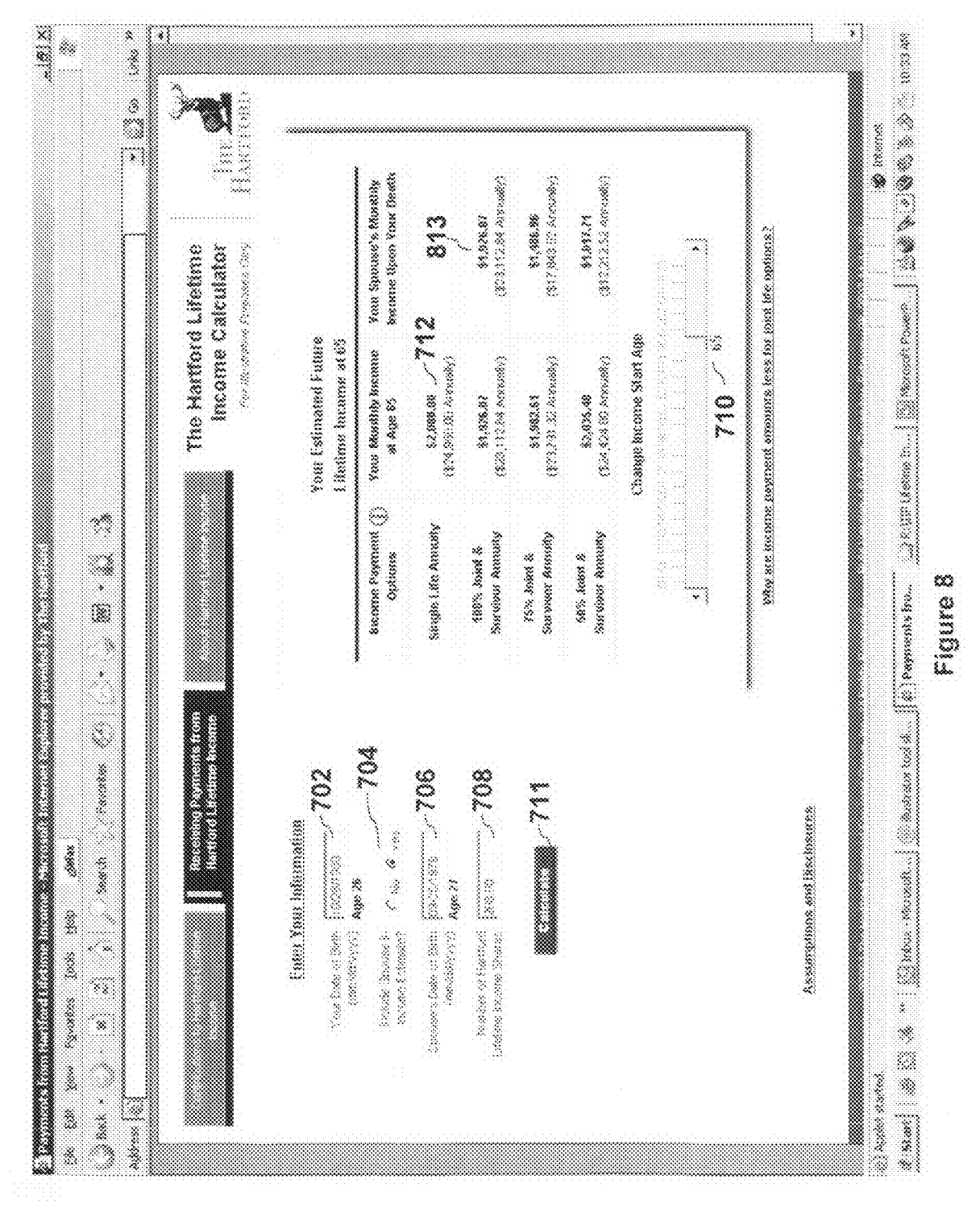

As shown by FIGS. 7 and 8, the lifetime income share calculator may also be used to determine a participant's estimated future lifetime income. The participant would put in the participant's date of birth in field 702 of FIGS. 7 and 8. Then, the participant would indicate in field 704 whether the participant's spouse was to be included in the income estimate. If a spouse were to be included, the spouse's date of birth would be entered into field 706. Then, the number of shares the participant owns would be entered in field 708. The user then presses the calculate button 711 and the monthly and annual income is shown in field 712, including different income payment options. If a spouse was included in the income estimate, then the spouse's monthly and annual income upon the participant's death is shown in field 813 of FIG. 8. The participant would indicate the age that the participant wishes the income to start using the slider 710.

This illustration technology allows each participant to solve for his or her retirement objectives in the manner most meaningful for the purchaser (e.g., solve for how many lifetime income shares could be bought or, alternatively, determining how much money needs to be invested today to meet the participant's retirement income target).

As the illustration is based on actual current share purchase rates, it is also fully actionable. A participant or annuitant can, in many cases, effect an immediate transfer to purchase some or all of the lifetime retirement income the participant deems prudent to mitigate their personal survival risk. The calculation results are preferably fully printable, allowing the potential participant to review the information, which aids in the decision making process.

After reviewing the information, the participant can also elect to make a series of purchases of lifetime income shares through the regular investment of plan contributions. A participant or annuitant can elect to purchase lifetime income shares via on-going contributions to his employer's 401(k) plan or via automatic deductions from his paycheck. Alternatively, the participant or annuitant can directly transfer a lump sum from an existing 401(k) plan account. One of ordinary skill in the art will readily appreciate that other purchasing methods may be utilized without departing from the spirit of the present invention.

The following tables illustrate the hypothetical effects of various purchases of lifetime income shares at various ages:

TABLE 1

INCOME PURCHASED BY PERIODIC CONTRIBUTIONS

| Age Contributions Begin | Average Share Price | Total Contributions (at 100/Month until age 65) | Total Shares Purchased | Monthly Income Retirement | Total Income Received From Age 65 to 85 | Total Income Received From Age 65 to 95 |
|---|---|---|---|---|---|---|
| 20 | $ 350.65 | $54,000 | 154 | $1,540 | $ 369,600 | $554,400 |
| 30 | $ 500.00 | $42,000 | 84 | $ 840 | $201,6000 | $302,400 |
| 40 | $ 697.12 | $30,000 | 43 | $ 430 | $103,200 | $154,800 |
| 50 | $1,000.00 | $18,000 | 18 | $ 180 | $ 43,200 | $ 64,800 |

This table highlights several important features of the Lifetime Income Shares. For example, in accordance with the preferred embodiment, the price per share differs according to each purchaser's age. Further, the amount of income per share is standardized (i.e., $10/month). As shown in the last two columns of Table 1, the total amount of lifetime income received is largely a function of the participant or annuitant's actual lifespan.

The actual share price, and thereby the total shares purchased, will vary with the participant or annuitant's age at purchase and a prevailing interest rate at time of purchase, with more shares being purchased when rates are high and fewer when rates are lower. This implicit "dollar-cost averaging" generally allows the participant or annuitant to purchase their guaranteed retirement income in a highly cost-effective basis.

TABLE 2

INCOME PURCHASED BY TRANSFER

| Age Contributions | Share Price | Transfer Amount | Total Shares Purchased | Monthly Income | Total Income Received | Total Income Received |
|---|---|---|---|---|---|---|
| 30 | $ 231.270 | $100,000 | 432 | $4,320 | $1,036,80 | $1,550,200 |
| 40 | $ 333.19 | $100,000 | 254 | $2,540 | $ 609,600 | $ 914,400 |
| 50 | $ 6709.12 | $100,000 | 147 | $1,470 | $ 352,800 | $ 529,200 |
| 60 | $1,190.0 | $100,000 | 84 | $ 840 | $ 201,600 | $ 302,400 |

Similar to Table 1, Table 2 highlights several important features of the Lifetime Income Shares. As in Table 1, Table 2 highlights the fact that the price per share differs according to each purchaser's age, the amount of income per share is standardized (i.e., $10/month), and that the total amount of income received is a function of a purchaser's life. Table 2 also illustrates the increased income received from purchasing shares in a lump sum.

After the participant elects to purchase one or more lifetime income shares, the provider, benefits provider, or offeror of the shares preferably coordinates the purchase and maintains records of the transaction. For example, information pertaining to the participant's name, ID, employment status, address, contribution amount, and vested amount is preferably recorded and shared among the relevant parties. This allows all of the parties involved to maintain up to the minute accurate reports relating to the lifetime income shares investment.

Lifetime income shares may allow the participant or annuitant to put some portion or all of his or her other shares back to the insurer. In the preferred embodiment, the participant or annuitant may surrender shares to the insurer, subject to an anti-selection bid asked spread. For example, a typical "put" price would be 96% of the "ask" price for the same "cost" of share being put. Again, the insurer offering the shares coordinates the withdrawal and maintains records of the transaction.

When a participant terminates employment after purchasing lifetime income shares as part of demand contribution a plan, such as a 401 (k) plan, he or she has the option to either (i) cash out the lifetime income shares through a "put" transaction, as described above; or (ii) take a certificate for future guaranteed income represented by the shares.

Importantly, once a lifetime income share is purchased, it is fully portable. With the possible exception of certain de minimus accommodations (e.g., less than five shares purchased, defined contribution plan vesting rules, etc.). There are no circumstances under which the income promised by the lifetime income shares will not be paid, excepting only the participant or annuitant's exercise of any redemption or "put" rights he or she may have, if any.

Lifetime income shares are preferably made available in an IRA form and the certificate distributed by an employers plan is in, or convertible to, an IRA format. In the IRA format, lifetime income shares can be purchased directly by the individual (subject to IRA contribution limits). The present invention also accepts unlimited additional purchases, or as transfers of, other tax-qualified funds.

Lifetime income shares are also available in the form of a non-qualified annuity with the ability to accept both flexible and model premiums.

Figure 9:
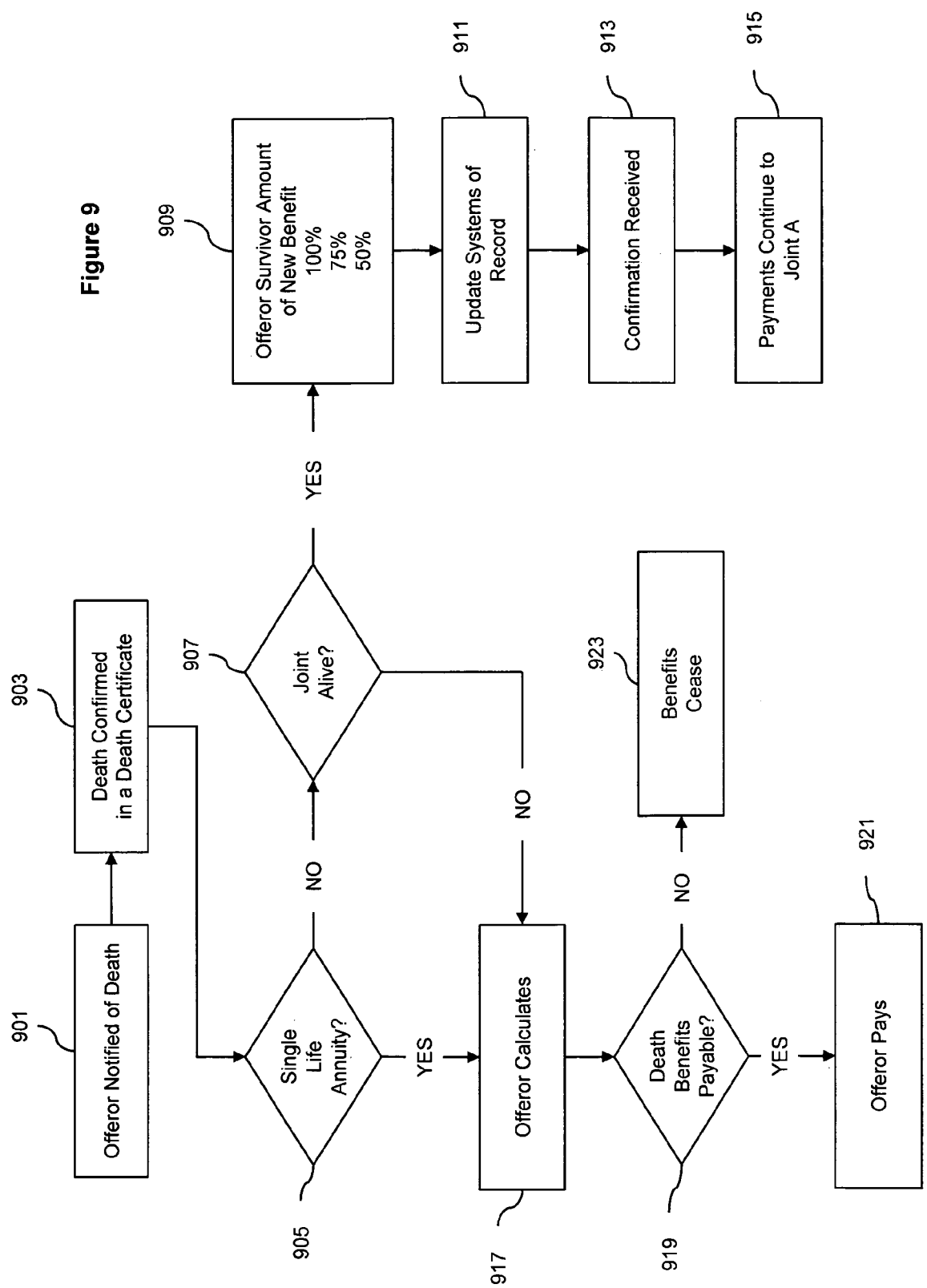
FIG. 9 is a flow chart depicting the process of determining the death benefit of a holder of a lifetime income share purchased using the model in accordance with the preferred embodiment of the present invention.

In addition, lifetime income shares can have a death benefit payout after lifetime income payments have commenced as depicted in FIG. 9. This benefit may be utilized with any of the described models. An alternative death benefit may allow beneficiaries of the participant/annuitant to convert the original shares into a different class of shares on the beneficiaries' life that reflect the age of the beneficiary. These death benefit shares may have different liquidity, redemption, and other features from those originally purchased.

Prior to income commencement, the death benefit will equal total contributions (premium) received, less any redemption amounts (surrenders) paid, if applicable. After the offeror is informed of the purchaser's death 901, the offeror determines whether the lifetime income share was purchased as a single life annuity or a joint life annuity as depicted by 905. In this example, the offeror is notified of death 901 via death certificate 903. However, it is contemplated that other forms of death confirmation can be utilized in accordance with the present invention. A joint annuitant is a person in addition to the annuitant on whose continuation of life annuity payments may be made.

If the lifetime income share comprises a joint annuitant feature, the offeror determines whether the joint annuitant is alive as depicted in 907. If the annuitant is alive, the offeror determines the new death benefit amount 909.

In the preferred embodiment of the present invention, the death benefit is a predetermined percentage of the original lifetime income benefit. As depicted in FIG. 9, the annuitant can select either 50%, 75%, or 100% of the original benefit. However, one of ordinary skill in the art will readily appreciate that any percentage can be chosen, either at the time the lifetime income share is purchased or at the time of the initiation of periodic benefit payments.

The offeror then updates the system records to reflect any new payments 911 and coordinates the confirmation of any new payment to the relevant parties 913. Payments then continue throughout the life of the joint survivor as depicted in 915.

If the participant is a single annuitant or after the joint annuitant is deceased, the offeror calculates the relevant death benefits, if any as depicted in 917. In the preferred embodiment of the present invention, the death benefit will preferably be the greater of zero or total contributions (premium) received less any redemption amounts (surrenders) paid, if applicable, less all income payments made prior to the death of the participant and, if applicable, the joint annuitant. If death benefits are payable, the offeror pays any benefit to the selected beneficiary 921. If no benefit payment is due, benefits cease 923.

Figure 10:
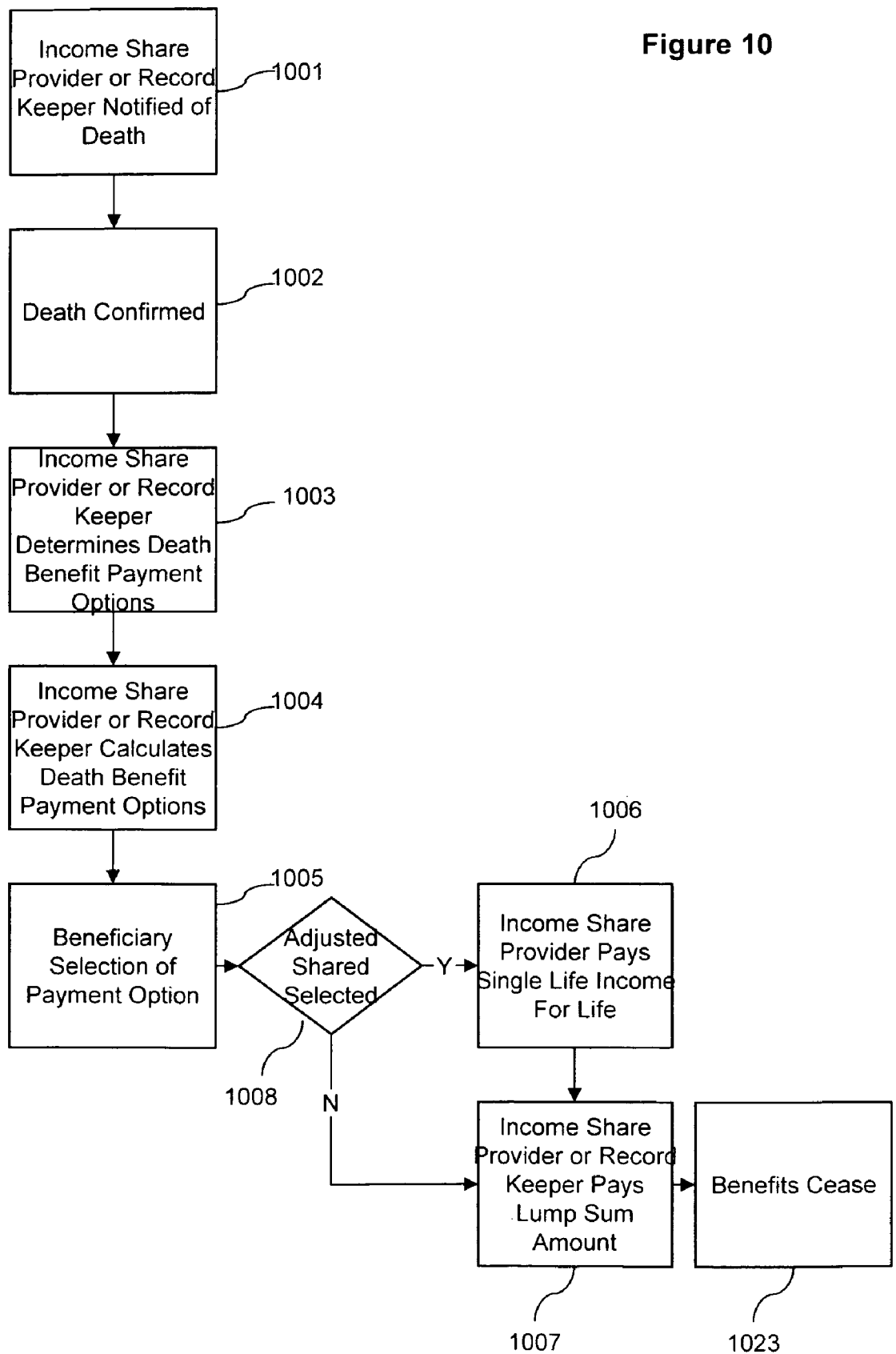
FIG. 10 is a flow chart depicting the process of determining the pre-income death benefit of a holder of a lifetime income share purchased using the model in accordance with the preferred embodiment of the present invention.

In addition, lifetime income shares can have a pre income death benefit. The death benefit payout depicted in FIG. 10 assumes that alternative death benefits are available, the selection of options to be made by the beneficiary, in this case. This death benefit structure may be utilized with any of the described models. The alternatives, typically, would be either a lump sum or an "annuity" death benefit. The alternative "annuity" death benefit may, for example, allow beneficiaries of the participant or annuitant to directly convert the full actuarial value of the original shares into a different class of shares on the beneficiary's life. The converted shares would reflect the age or the age and sex of the beneficiary. These death benefit shares may have liquidity, redemption, and other features that differ from those features in the originally purchased income shares. The lump sum death benefit typically would equal total contributions (premium) received, less any redemption amounts (surrenders) paid, if applicable. In this example, the income share provider is notified of death 1001 via death certificate 1002. After the income share provider is informed of the purchaser's death 1001, the income share provider determines the death benefit payment options as depicted by 1003. However, it is contemplated that other forms of death confirmation can be utilized in accordance with the present invention.

In 1005, the beneficiary selects either a lump sum option or the adjusted shares option. If adjusted shares are selected in 1008, then in 1006, the income share provider pays single life income for life. If adjusted shares are not selected in 1008, then in 1007, the income share provider pays a lump sum amount. After the lump sum payment is made or if no benefit payment is due, benefits cease 1023.

Recordkeeper Calculate Model

Under the recordkeeper calculate model, in which the provider acts as the primary records keeper/coordinator (i.e., similar to a plan administrator recordkeeping for mutual fund investments), a participant is provided with the opportunity to purchase a lifetime income share as part of a portfolio of options in a 401 (k). For example, the participant's employer can introduce a retirement plan with this feature. Alternatively, the benefits provider of an existing retirement plan can add this feature to an existing plan. It is contemplated that any other provider or entity can provide information related to lifetime income shares. Information sources include, but are not limited to, the Internet, direct advertising brochures, other marketing materials, or any other means of making information available to a potential participant.

As with the insurer calculate model, in the recordkeeper calculate model, a participant can access information related to a lifetime income share via an online platform. Similar access to and functionality of the online platform is provided for both models.

After reviewing the information, the participant can preferably elect to purchase one or more lifetime income shares, including fractional shares. For example, to purchase a share utilizing the recordkeeper calculate transaction model, a participant can elect to purchase lifetime income shares via an automatic deduction from her paycheck.

Alternatively, the participant can directly transfer a lump sum from an existing account. It is contemplated that any method of purchase can be utilized in accordance with the present invention.

After the participant elects to purchase one or more lifetime income shares, the income share provider coordinates the purchase and maintains records of the transaction. For example, information pertaining to the participant's name, ID, employment status, address, contribution amount, and vested amount is recorded and shared among the relevant parties. This allows all of the parties involved to maintain accurate reports on a daily basis relating to the lifetime income shares investment.

A lifetime income share allows the participant to withdraw some portion of its value. In the preferred embodiment, the participant withdrawals funds subject to a 96% bid/asked spread (which could also be structure as "redemption charge" of, for example, 4%). Again, the provider coordinates the withdrawal and maintains records of the transaction.

As with the insurer calculate model, when a participant terminates employment after purchasing one or more lifetime income shares as part of a 401 (k) plan, he or she has the option to either (i) cash out the lifetime income shares; or (ii) take a certificate for future guaranteed income. If a participant is fully vested, he or she receives the full value of the lifetime income shares. However, if the participant is only partly vested, he or she receives a pro-rated portion of the cashed out value or the future guaranteed income. In other words, the amount available to a participant is reduced by the percentage that he or she is vested. For example, if a participant is 50% vested, he or she will receive half of the cash out value or half of the future income payment. As with the previous steps of the process, the provider, benefits provider, or offeror of the shares coordinates the withdrawal and maintains records of the transaction.

Lifetime income shares under the recordkeeper calculate transaction model also can have an identical death benefit payout as depicted in FIG. 9.

Annuity Platform Model

In the annuity platform model, the funds management aspect is separated into two distinct phases. Specifically, the two phases are an accumulation phase and a deferment/disbursement of benefits phase. The administration, management, record keeping and any other relevant aspects of each phase are described below.

In the accumulation phase an external record keeper is, in effect, the administrator of information and funds related to the accumulation phase.

The provider of the Lifetime Income Share Plan will participate in an exchange of relevant records and other pertinent information with the record keeper. Such an exchange will primarily serve to maintain accurate plan records of both parties, but may also be used for any other purpose (e.g. collection of statistical data for analysis).

Although the present embodiment is further described in terms of an exchange between a plan provider's platform, an annuity platform and a record keeper's platform it, may also be desirable to establish such an exchange with a plan sponsor (e.g. a company purchasing retirement benefits for employees), or any other relevant entity.

Since a given record keeper and a plan provider may use different platforms, an intermediate platform can be used to facilitate an exchange of information. One such platform, described herein, is an annuity platform. The annuity platform, as well as any other platform described can be implemented in a variety of ways (e.g. an intelligent electronic device, software, a web site interface, etc.) without departing from the spirit of the present invention. However, in the preferred embodiment the platforms are described in terms of a software interface capable of interaction over a communications network.

The annuity platform ideally possesses the ability to display web pages based on links received from the record keeper's platform. Furthermore, the annuity platform will use the data sent to the abovementioned web pages to display appropriate participant or plan information. Additionally, the annuity platform is able to have single sign-on capabilities with appropriate authentication determined by either: the record keeper's platform, the plan provider's platform or any other relevant party.

The annuity platform possesses the ability to accept and process batch files and real time data received from the record keeper's platform, as well as the ability to send files back to the record keeper's platform. The batch files may, for example, contain any of the following: plan ID, plan type code, the participant's ID, the participant's date of birth, the participant's gender, the participant's state of residence, number of shares owned by the participant, current death benefits on the participant's account, total contributions made by the participant, total money-out transactions and total death benefit paid to date. Furthermore, it is understood that since the annuity platform's primary purpose is to create an interface between the record keeper's platform and the plan provider's platform any information passed by one party to the annuity platform can also be sent to the second party, or sent back to the original sender, if such a need arises.

The annuity platform will further be able to interface with an internal platform used by the provider of the Lifetime Income plan. Moreover, the annuity platform is able to receive and process files from a plan provider's platform, as well as, send files received from the record keeper, to the plan provider's platform for: accounting, reserving, pay out as well as to serve any other need arising from the implementation of the present invention.

In order to maintain relevant records and accurate payment information the annuity platform will also participate in, send and receive transactions, with the plan provider's internal platform.

If a given participant wishes to set-up a deferment account, the annuity platform will send certain files to the plan provider's platform regarding the participant wishing to set-up a deferment account.

Furthermore, the annuity platform is able to send a file or batch of files to the plan provider's platform, which summarize a given participant's transactions for a given period of time (e.g. a day, week, etc.). Such files could contain a summary of the accounting done for a given period of time between transmissions of the accounting file.

These types of files are not limited to accounting information, and can be created to give an efficient summary of data related to any transaction processed by either platform. A summary of participant transactions can then be used for a variety of applications (e.g. to balance against daily bank wire/wire transmission advice).

It is also possible for the annuity platform to receive any of the files which it may send to the plan provider's platform. Files received from the plan provider's platform can be used, among other things, to reconcile data from a daily transmission or daily bank wire. Additionally, a plan provider may elect to send a reconciliation acknowledgment upon reconciling data in this way.

The plan provider's platform will also transmit information to the annuity platform which includes each participant's account summaries. Theses summaries will include any or all of the following: participant's plan ID, plan-type code (e.g. 401K, 457, 403b, etc.), state of participant, gross contributions, gross surrender of death benefit amount and gross surrender of cash out amount.

The account summaries sent by the plan provider's platform to the annuity platform will also include any or all of the following: participant's ID, date of birth of a participant, gender of a participant, number of shares owned by a participant, current death benefits of a participant, total contributions made during the month by a participant, total surrenders during the month (e.g. cash out) by a participant, death benefit paid during the month to a beneficiary and any other relevant information.

[Record Maintenance]

The plan provider must maintain up-to-date and accurate records. In order to do so, the record keeper will periodically transmit to the annuity platform, either a single or several files, containing transaction information related to a particular Lifetime Income plan. Wherein, the annuity platform is able to accept such transactions, process them, and update the participants' information.

The information transmitted to the annuity platform from the record keeper's platform could be any of the following: information used to setup a participant account on the annuity platform, payroll contributions from plan sponsor's payroll, transfers from funds within a participant's plan, amount of Lifetime Income shares purchased, transfers from the plan provider's Lifetime Income option back to the record keeper's platform, the maximum amount of Lifetime income available for transfer, notification of a plan participant's death, information which might be needed to setup a beneficiary account, any lump sum payment a beneficiary received on a death claim, number of converted Lifetime Income shares a beneficiary received as a death benefit payout, transaction which may cause a participant to move from the accumulation phase to the deferment phase, and any correction transaction required to correct an error in one of the above transactions.

Figure 12:
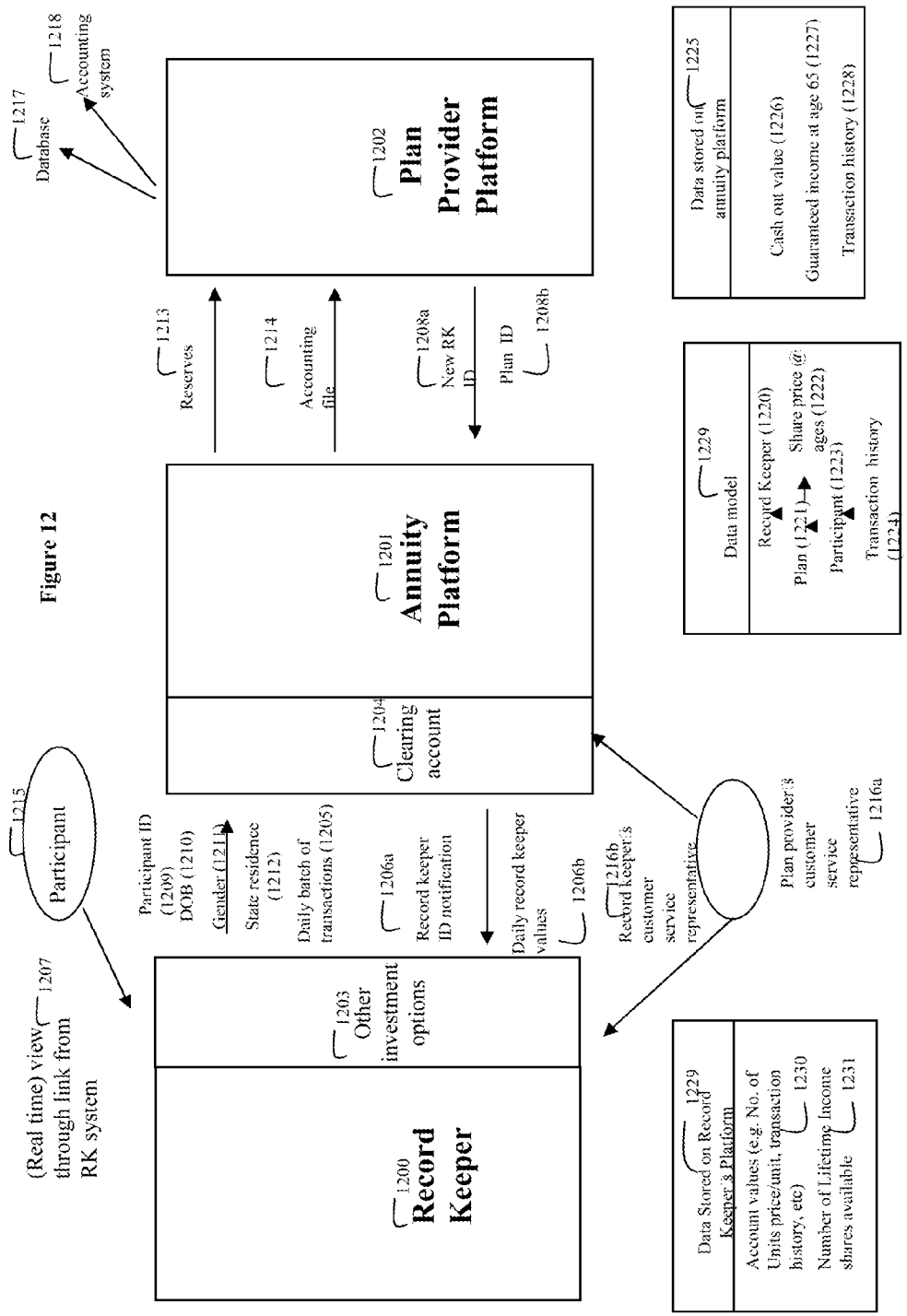
FIG. 12 is a high-level context diagram depicting the sequence of steps of a daily interaction between the record keeper platform, annuity platform and the plan provider's platform, in accordance with the annuity platform embodiment of the present invention.

FIG. 12 depicts a general example of the typical interactions between the annuity platform, plan provider's platform and the record keeper's platform. As depicted in FIG. 12, for a given participant 1215, the record keeper 1200 would manage the Lifetime Income plan as well as any other investment options 1203 provided by the plan provider (e.g. money market account) and associated with the participant 1215.

Additionally, for each participant 1215, the record keeper's platform 1200 would send the daily batch of transactions 1205, to the annuity platform 1201. As part of the file or files sent to the annuity platform 1201, the record keeper's platform 1200 would include the following data for a given participant 1215: participant ID 1209, date of birth 1210, gender 1211 and state of residence 1212.

Additionally, the record keeper's platform may store certain values. Values stored by the record keeper's platform 1229 may include, account values 1230 (e.g. number of shares purchased, price per share, transaction history, etc.) and the number of Lifetime shares available 1231.

In turn, the annuity platform 1201 would send the daily record keeper's values 1206b as well as the record keeper's ID notification 1206a to the record keeper's platform 1200.

In order to process the information received by the annuity platform 1201 from the record keeper's platform 1200, the annuity platform 1201 would set up an intermediate clearing account 1204.

[Clearing Account]

The clearing account 1204 verifies, in a systematic manner, the information transmitted by the record keeper, for each transaction received in the daily transaction file by the annuity platform. The clearing account 1204 records are used to ensure that amounts received from record keeper's platform 1200 balance to amounts processed within annuity platform 1201, and allow record keepers to reconcile that the amounts passed related to Lifetime Income share purchases are equal to the amounts processed by the annuity platform 1201.

The plan provider's platform 1202 will send a new record keeper's ID 1208a and plan ID 1208b (if a set up for a new record keeper is required). The annuity platform 1201 would then send the amount of reserves 1213 and an accounting file 1214, to the annuity platform 1201. The annuity platform 1201 may then pass on any required information to an accounting system 1218 or an internal database 1217.

In order to adequately manage and store information, the annuity platform 1201 would use a specific data model 1219. The data, managed accordingly to the data model 1219, would be divided by types, some division types may be sorted by: data related to record keeper 1220, data related to a specific plan 1221, data related to share prices for different age groups 1222, data related to specific participant's 1223, data related to a specific transaction history 1224 and any data related to a clearing account 1204. Examples of data stored by the annuity platform 1201 include: cash out value 1226, guaranteed income at age 65 1227 and transaction history 1228. Any other data management scheme may be used without departing from the spirit of the present invention.

In order to allow participants 1215 access to plan related information, the participant 1215 would be able to view any transaction related information using a telecommunications network (e.g. the internet) through a web link 1207 from the record keeper's platform 1200 to an interactive website in real-time. Furthermore, in order to allow participants 1215 further access to plan related information the record keeper may employ a customer service representative 1216b; the plan provider may also offer access to a customer service representative 1216a.

Figure 13:
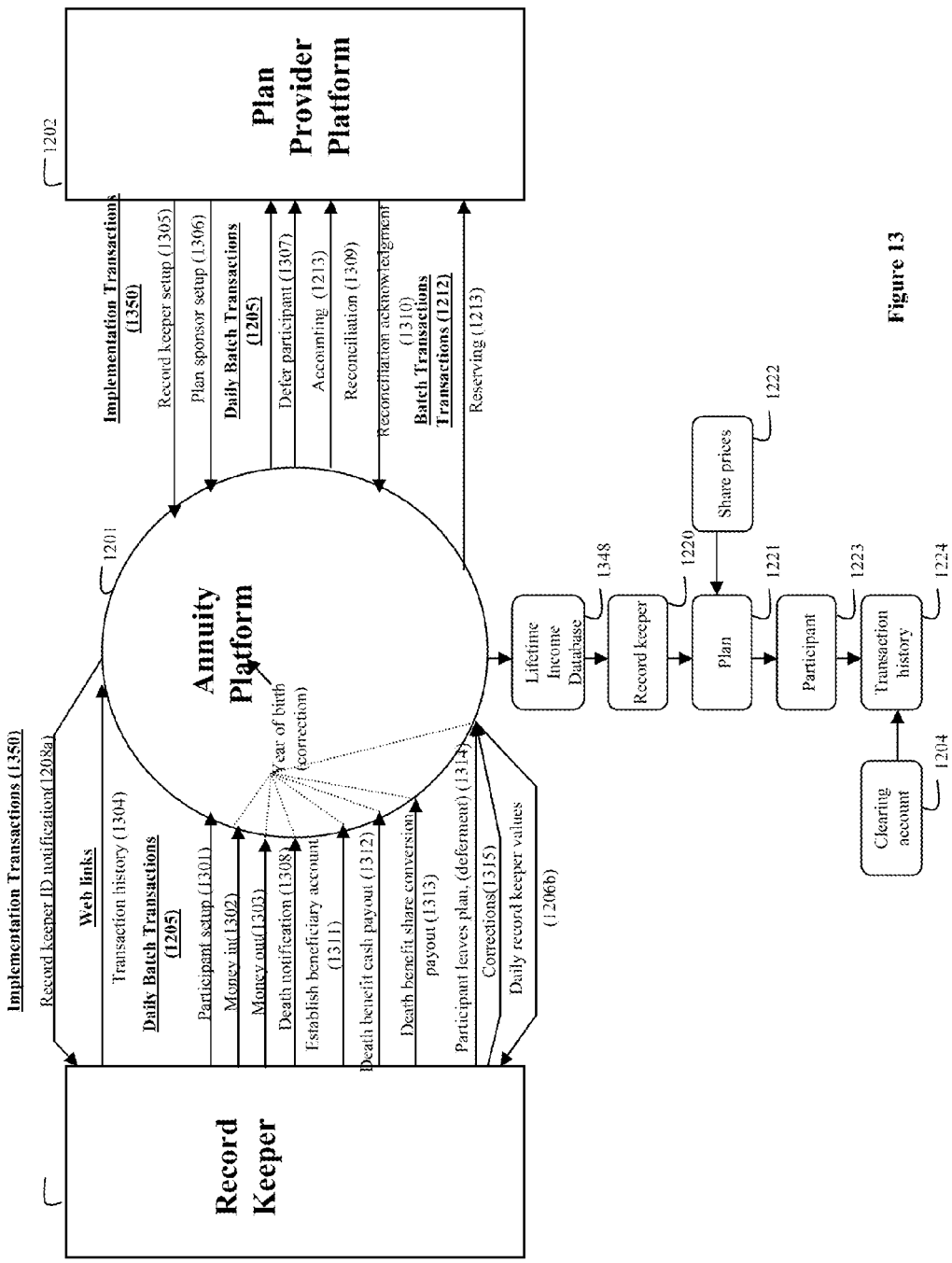
FIG. 13 is a diagram depicting the types of transactions, processed by and transferred between, the record keeper platform, annuity platform and the plan provider's platform in accordance with the annuity platform embodiment of the present invention.
Figure 14:
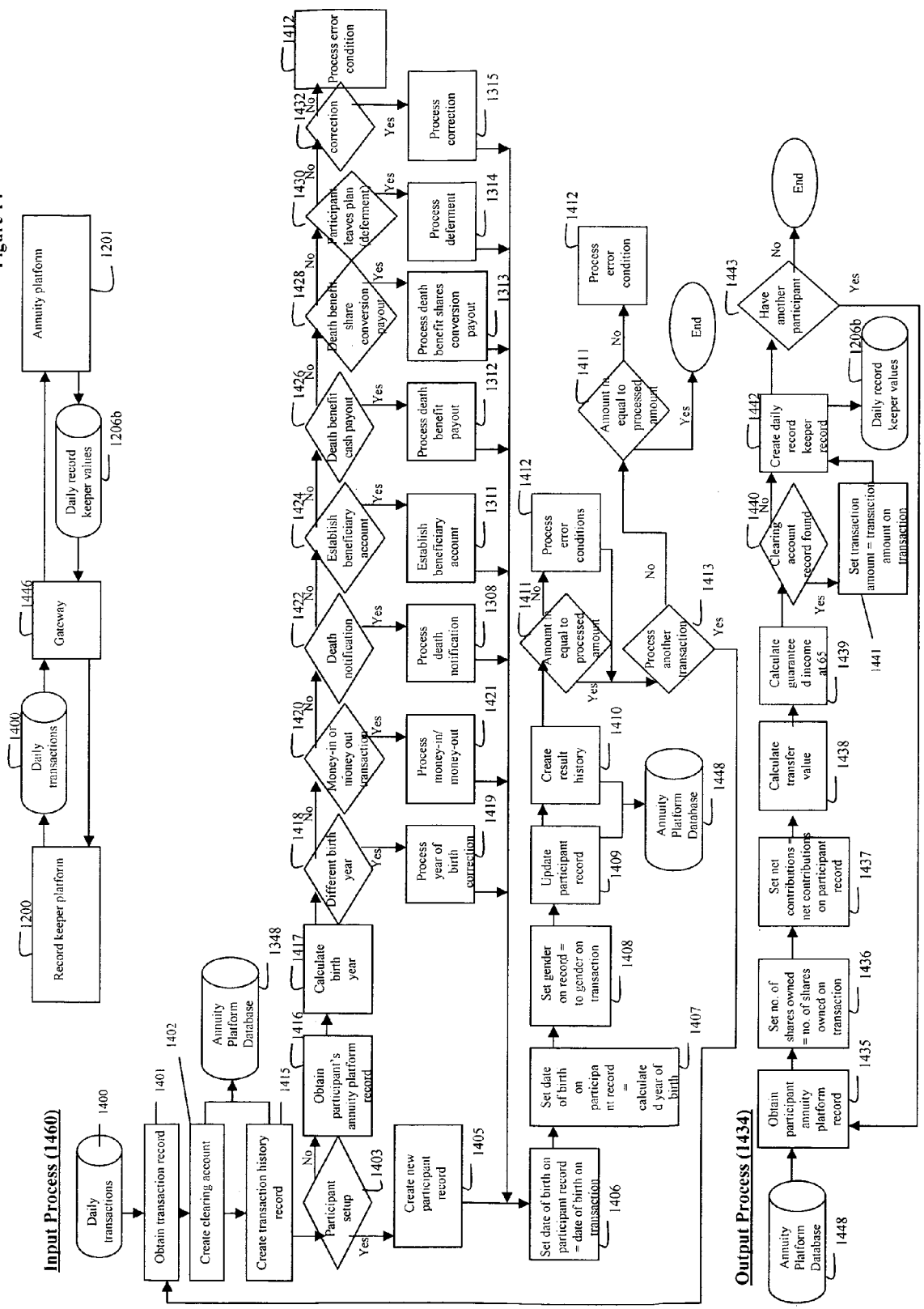
FIG. 14 is a flow chart depicting the sequence of steps taken by the annuity platform when processing a batch of files received from the record keeper's platform in accordance with the annuity platform embodiment of the present invention.

The daily transactions processed by the annuity platform, as depicted in FIGS. 13 and 14, will now be discussed in detail.

Prior to receiving any information from the record keeper platform 1200, the annuity platform will transfer over a record keeper ID notification 1206a to the record keeper's platform. When a daily batch file is received from the record keeper the annuity platform will obtain a transaction record in step 1401, create a clearing account record in step 1402, and create a transaction history record in step 1415. A transaction history record 1304 will then be passed on from the record keeper's platform 1200 to the annuity platform 1201.

In step 1403, if a participant set up transaction is not required then the annuity platform will: obtain a participant's annuity platform record in step 1416, calculate the year of birth for the participant in step 1417, compare the calculated year of birth against the year of birth on the transaction in step 1418 (if required process a year of birth correction in step 1419) and verify if a money-in/money-out transaction is needed in step 1420, process any required money-in and money-out transactions in step 1421.

Additionally, the annuity platform will: verify if a death notification transaction is needed in step 1422, process any required death notification in step 1308 and verify if a beneficiary account establishing transaction is needed in step 1424.

The annuity platform will also: establish any required beneficiary account in step 1311, verify if a death benefit transaction is needed in step 1426, process any required death benefit transactions in step 1312 and verify if a death benefit share conversion pay out transaction is needed in step 1428 if a participant set up transaction is not required then the annuity platform will.

Finally, the annuity platform will: process any required death benefit shares conversion payout 1313, verify if a deferment transaction is needed in step 1430, process any required deferment transactions 1314, verify if a correction transaction is needed in step 1432, process any required correction transactions 1315. If none of the aforementioned transactions are required in the file or batch of files, sent to the annuity platform, the annuity platform will process an error condition in step 1412.

If a participant set up transaction 1301 is required then the annuity platform will: create a new participant record in step 1405, set the date of birth on the participant's record to the date of birth passed along with the transaction in step 1406, set the date of birth on the participant's record to the calculated date of birth in step 1407, set the gender on the participant's record to the gender passed along with the transaction in step 1408, update the participant's record in step 1409 and create a result history in step 1410.

In the event a participant set up transaction is required, a verification is performed to check if the amount-in is equal to the processed amount-in step 1411, if it is not, an error condition is generated in step 1412. If the amount-in does equal to the processed amount, a check is performed if another transaction is to be processed 1413, if another transaction is not needed, then another verification of whether the amount-in equals the processed amount is carried out in step 1411. If the check verifies that the amount-in is equal to the processed amount, then the transaction is over.

Upon processing any information received from the record keeper's platform 1200, using the annuity platform database 1348, the annuity platform 1201 will perform an output process 1434. During the output process 1434, the annuity platform will: obtain a participant's annuity platform record in step 1435, set the number of shares owned to the number of shares owned on participant's record in step 1436, set the net contributions to the net contributions on a participant's record in step 1437, calculate transfer values in step 1438, calculate guaranteed income at 65 in step 1439, search for clearing account records in step 1440. If the clearing account records are found in step 1440 then the annuity platform 1201 will set the transaction amount to the transaction amount on the clearing account in step 1441. If a clearing account record is not found in step 1440, the annuity platform 1201 will create a daily record keeper record in step 1442 and check if another participant's data requires the same processing in step 1443. If another participant's data does require processing the steps above are repeated.

Additionally, the annuity platform and the plan provider's platform will participate in daily exchanges of information. The plan provider's platform 1202 will send to the annuity platform 1201 the following transaction information: record keeper setup information 1305, plan sponsor setup information 1306 and a reconciliation acknowledgment 1310. In turn, the annuity platform 1201 will send transaction information to the plan provider's platform 1202, such information may include: information related to participant deferment 1307 and accounting information 1213.

Furthermore, it may be necessary, in order to maintain a high level of record accuracy, to periodically check if the current age of a given participant 1215 on record is indeed accurate.

The transmission of the above information could occur on a daily basis. Nevertheless, the information could be transmitted more or less frequently without departing from the spirit of the present invention.

The money-in and money-out transactions described in step 1420 are now described in further detail. A money-in transaction refers to any transaction in which a plan participant contributes financially to his or her plan (e.g. purchase of Lifetime Income shares). A money-out transaction refers to any transaction in which funds are dispensed to a plan participant (e.g. monthly payout of participant's Lifetime Income).

When processing each money-in and money-out transaction 1420 received from a record keeper platform for a given participant, the annuity platform is able to: check whether a participant's record exists (if it does not exist an error condition is generated), compare the year of birth on the participant record against the year of birth on the transaction (year in date of birth) and if the year of birth has changed a year of birth correction transaction is triggered before processing continues, if the date of birth has changed set the date of birth on the participant's record equal to the date of birth passed on in the transaction, if year of birth has changed, calculate the participant's year of birth using the year in the date of birth.

Furthermore, when processing each money-in and money-out transaction 1420 received from a record keeper platform for a given participant, the annuity platform will also be able to: set the gender on the participant's record equal to the gender passed on in the transaction, calculate the participant's age by computing the difference between the year in the transaction date and the year of participant's birth on transaction, locate the share price information wherever it may be within the system (e.g. from record keeper's records, plan provider's records, etc), for the participant's year of birth, depending on transaction type.

Additionally, when processing each money-in or money-out transaction received from a record keeper platform for a given participant, the annuity platform will also be able to: calculate the number of shares purchased by any suitable method (e.g. taking the quotient of transaction amount by the share price for the participant's birth year), calculate the number of shares surrendered by any suitable method (e.g. taking the quotient of transaction amount by 0.96 and further multiplying the result by the share price for the participant's birth year), calculate the net contributions for a participant (if less then zero, the amount could be set to zero and future contributions will increase the net contributions from zero), calculate the number of shares owned (depending on transaction type, add number of shares purchased or subtract number of shares surrendered from current number of shares owned) and update a participant's record.

The correction transaction 1432 is now described in further detail. In the instance of an error in the information previously transmitted to the annuity platform by the record keeper platform, the record keeper platform is required to submit a correction of the erroneous data. In such a case the annuity platform will perform a correction transaction.

In general, a corrections transaction will reverse, and if appropriate, reapply transactions to be corrected.

Additionally, a plan provider may choose to have the correction transaction processed by the record keeper's platform. In this case the processing of the correction transaction may be conducted in the same manner as the money-in and money-out transactions processed by the record keeper's platform.

If the correction transaction involves correcting year of birth data, the annuity platform is able to reverse and reapply all transactions using proper year of birth.

In order to exclude as many errors as possible from occurring during record management, the annuity platform will send back data for each participant and/or beneficiary to the appropriate record keeping platform. A file is produced after all daily input transactions for a given record keeper have been processed. Although this will preferably take place on a daily basis, the plan provider may elect to increase or decrease the frequency with which the annuity platform sends transaction records back to the record keeping platform.

The establishing a beneficiary account transaction 1424 is now described in further detail. Often times a participant may have dependants (e.g. a spouse) who share the participant's Lifetime Income. In such an instance, the participant may wish to ensure that at least a portion of the participant's Lifetime Income is transferred to the dependent in the event of the participant's death, this may be done by establishing a beneficiary. If a beneficiary is established, the beneficiary may be compensated using a variety of methods (e.g. a lump sum, monthly payments, etc), chosen by the plan participant.

Because of the intricacies involved in selecting and making payments to a beneficiary, the annuity platform possesses certain capabilities to be able to carry out such functions properly. Therefore, when establishing a beneficiary, the annuity platform will: validate that a participant's record exists (and generate an error condition if it does not exist), validate that a given beneficiary's record does not already exist for the given participant and generate an error condition if it does exist.

Additionally, when establishing a beneficiary the annuity platform will also: compare the year of birth on the participant record against year of birth on transaction (year in date of birth). If the year of birth has changed, it will trigger a year of birth correction transaction before proceeding with further processing. If the participant's date of birth has changed, it will set the date of birth on the participant record equal to the date of birth passed on in the transaction data, calculate the participant's year of birth using the year in the date of birth, locate the share price for the participant's year of birth and locate the share price for the beneficiary's year of birth.

Moreover, when establishing a beneficiary, the annuity platform will: calculate the cash death benefit amount by taking the product of the participant's net contributions and the beneficiary's percentage of death benefit on the transaction, calculate the cash death benefit amount using any suitable method (e.g. by computing 20% of the product of the cash out value and the beneficiary's percentage of death benefit on transaction), use the beneficiary's ID included in the transaction as the beneficiary record key, use the record keeper ID included in the transaction as the beneficiary record key, and use the plan ID included in the transaction as the beneficiary record key.

Further, when establishing a beneficiary the annuity platform will: set the date of birth on the beneficiary's record as equal to the date of birth passed on in the transaction, calculate the beneficiary's year of birth using the year in the date of birth, set the gender on the beneficiary's record as equal to the gender passed on in the transaction, set the number of shares owned on the beneficiary's record as equal to the converted shares previously discussed, set cash benefit amount as equal to the calculated cash death benefit amount, set the beneficiary net contributions data to zero, set the beneficiary transaction value to zero, and set the beneficiary guaranteed income at age 65 to zero and create new beneficiary record.

Furthermore, the annuity platform will calculate the beneficiary's converted shares. Several conversion schemes are possible, one such method uses the product of the number of shares owned by the participant and the beneficiary's percentage of death benefit on transaction as further multiplied by the quotient of the share price for the participant's year of birth by the share price for the beneficiary's year of birth.

The death notification transaction 1422 is now described in further detail. In the event of a plan participant's death, several scenarios may take place, depending on the options chosen to be implemented by the plan participant in such an event. In order to properly handle all of the feasible outcomes related to a death notification transaction the annuity platform will: validate that a participant's record exists, compare the year of birth on a participant's record against year of birth on the transaction. If the year of birth has changed it will trigger a year of birth correction transaction. set the date of birth on a participant's record equal to the date of birth passed on in the transaction, and calculate the participant's year of birth (e.g. using the year in date of birth).

Furthermore, in the event of a death transaction, the annuity platform will: set the date of death notification on a participant record equal to the appropriate death transaction date, set the date of birth on a participant's record equal to the date of birth passed on in the transaction, calculate a participant's year of birth, and set the gender on participant record equal to gender passed on in the transaction and update participant record.

Any feature which may be useful in the implementation of the annuity platform can be added without departing from the spirit of the present invention.

The death benefit cash payout transaction 1426 is now described in further detail. If a participant chooses to have a beneficiary, several payment method plans may be chosen in the event of the participant's death. One such plan is a "Death Benefit Cash Payout" plan. Under the "Death Benefit Cash Payout" plan, the beneficiary is paid a single lump sum as a result of the participant's death.

If a "Death Benefit Cash Payout" plan is chosen the annuity platform will perform, the following functions it will compare the year of birth on the beneficiary's record against the year of birth on the transaction file, and if the year of birth has changed it will trigger a year of birth correction transaction before continuing and set the date of birth on the beneficiary's record equal to the date of birth passed on in the transaction. Further, if the year of birth has changed calculate the beneficiary's year of birth by using the year in the date of birth. The annuity platform will also: set the gender on the beneficiary's record equal to the gender passed on in the transaction, set the number of shares owned on the beneficiary's record to zero and update the beneficiary's record.

The death benefit share conversion payout transaction 1428 is now described in further detail. If a participant chooses to have a beneficiary, the pay out amount to be received by the beneficiary, must be calculated. To do this the annuity platform converts the remaining shares owed to the plan participant at the time of the participant's death into an amount to be paid to the beneficiary. The beneficiary may be dispensed the amount through several methods (e.g. lump sum, payment by installments, etc.), which may be determined by the plan provider, the beneficiary or the participant.

Regardless of the payment method chosen, when a beneficiary is to be paid an amount as a result of a plan participant's death, the annuity platform will process a death benefit cash payout transaction. When a death benefit cash payout transaction is processed the annuity platform will: compare the year of birth on the beneficiary's record against the beneficiary's year of birth passed on in the transaction, if the year of birth has changed it will trigger a year of birth correction transaction before continuing, set the date of birth on the beneficiary's record equal to date of birth passed on in the transaction and calculate the beneficiary's year of birth using the year in the date of birth. Additionally, the annuity platform will: set gender on the beneficiary's record equal to the gender passed on in the transaction, create a deferral transaction that is sent to the plan provider's internal platform, and set the number of shares owned on the beneficiary's record to zero and update the beneficiary's record.

In order to determine the death benefits a beneficiary is entitled to, or in the instance that a participant may choose to leave the plan, the plan provider may use the value of the net contributions of the participant to determine the payout value. Some values which may be used when computing the net contributions of a participant are defined as follows:

Premium=Premium contributed t=Represents the timing (date) of an individual transaction—be it a payroll contribution, a transfer into Lifetime Income, or a transfer out of Lifetime Income. (For example, t represents the latest (most recent) transaction, t−1 represents the second latest transaction, and t=1 represents the first transaction made)

TA=Transfer amount requested out of the Lifetime Income plan x=Current age of participant At the time of the first premium the net contribution is equal to the amount of first premium (i.e. $NetContrib_1=Premium_1$, where $Premium_1$ is the initial premium amount) Thus, the net contribution may be calculated by computing $NetContrib_t=NetContrib_{t-1}+Premium_t-TA_t$. Surrender amounts which would otherwise cause the net contributions to become negative may be waived, thus the $NetContrib_t$ will never be less than zero.

When calculating either a death benefit sum or a lump sum to pay to an individual who chooses to terminate his or her plan early, several other values may be considered. Some values which may be used when computing such payouts are defined as follows:

DB=Death benefit

NetContrib=Net contributions paid t=Date of death

CumShares=Cumulative number of shares purchased by the participant

CSP=Current price per share p=Age of the participant at the time of death s=Age of the beneficiary at the time of death.

It is possible to compute the death benefit (or plan termination payout) using, at least, the two following methods:

$DB_t(1)$=the bigger of [$NetContrib_t$] and [20%*$CumShares_t$*$CSP_p$*96%]

$DB_t(2)$=$CumShares_t$*($CSP_p/CSP_s$)

The plan provider may allow the beneficiary or the participant leaving the plan to elect which of the two methods is used to compute the amount of death benefits or sum of payout. In the event that the latter of the two methods is elected (i.e. $DB_t(2)$), the death benefit paid to the beneficiary is in the form of Lifetime Income shares.

In the case where the plan provider specifies that the Lifetime Income shares do not have a liquidity feature, if the beneficiary dies before annuitization, the death benefit for the beneficiary's beneficiary is equal to $NetContrib_t$. Additionally if there is not a natural person beneficiary the death benefits will also be equal to the net contributions.

The participant leaves plan transaction 1430 is now described in further detail. A participant may also choose to leave the Lifetime Income plan prior to the benefit payout date, or prior to the completion of purchased Lifetime Income payout. In such a case, it is conceivable that a plan provider may elect to compensate the participant with a lump sum in place of the continuous Lifetime Income that the participant would otherwise be entitled to. The plan provider may elect to calculate the compensation a participant is entitled to in the same manner as the compensation a beneficiary is entitled to.

In order to complete this type of payout transaction, the annuity platform will perform the following steps: compare the year of birth on the beneficiary record against the beneficiary's year of birth passed on in the transaction. If the year of birth has changed trigger a year of birth correction transaction before continuing and set the date of birth on the beneficiary's record equal to the date of birth passed on in the transaction. Furthermore, the annuity platform will: calculate the beneficiary's year of birth using the year in the date of birth if the year of birth has changed, set the gender on the beneficiary's record equal to the gender passed on in the transaction, create a deferral transaction that is sent to the plan provider's platform, and set the number of shares owned on the beneficiary's record to zero and update the beneficiary's record.

Figure 15:
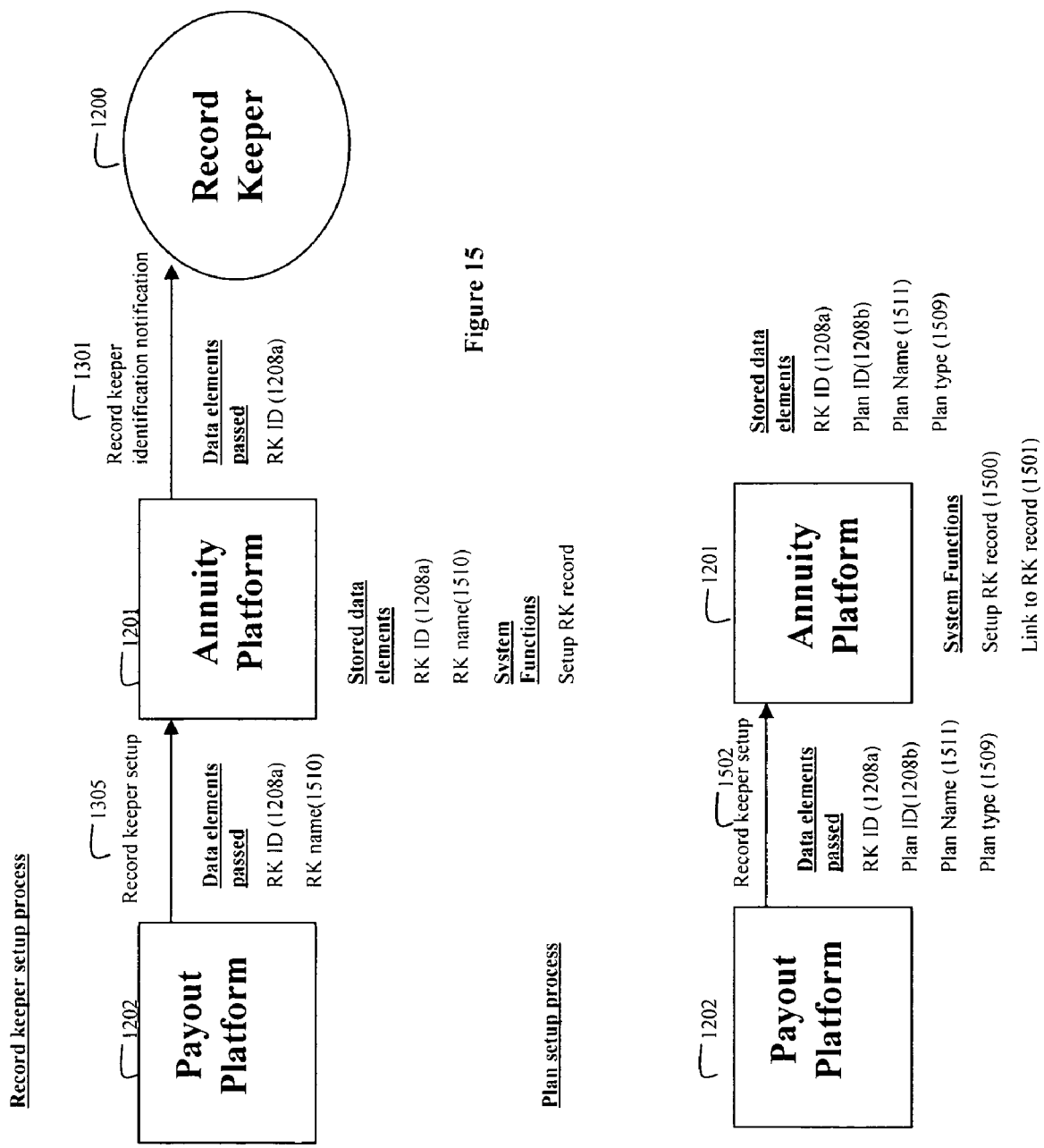
FIG. 15 is a flow chart depicting the sequence of steps taken when an account setup transaction is processed in accordance with the annuity platform embodiment of the present invention.

When a new record keeper 1200 wishes to participate in the Lifetime Income plan a new record keeper account is set up, as depicted in FIG. 15. First, the plan provider's platform 1202 initiates a record keeper setup transaction 1305 with the annuity platform 1201. The plan provider's platform 1202 passes a record keeper's ID 1208*a* and a record keeper's name 1510 to the annuity platform 1201. The annuity platform then stores the record keeper's ID 1208*a* and a record keeper's name 1510 and initiates a record keeper identification notification 1206*a* by transferring the record keeper's ID 1208*a* to the record keeper.

In order to set up a new plan, the plan provider's platform 1202 will initiate a plan setup 1502. When initiating a plan setup 1502 the plan provider's platform sends to the annuity platform 1201 a record keeper's ID 1208*a*, a plan ID 1208*b*, a plan name 1511 and plan type code 1509. The annuity platform then sets up the plan record 1500 and links the plan record to the record keeper's record 1501. Furthermore, the annuity platform stores the data elements received from the plan provider's platform 1202.

When a record keeper sets up a new account in step 1403 for a given participant certain information is transmitted by the record keeper's platform to the annuity platform for each participant. Such information may include a participant's birth date and gender, although any other relevant information may be included if a specific implementation of the present invention presents such a need.

Furthermore, upon completing a participant account setup transaction the record keeper will eventually transmit account information to the annuity platform.

The create a new participant record transaction 1405 is now described in further detail. After receiving the account setup information from the record keeper's platform for each participant's account, the annuity platform will conduct, the following operations: validate that a participant record does not exist and output an error condition if it does exist, use participant ID included in the transaction as the participant record key, use the record keeper's ID included in the transaction as the participant record key, use the plan ID included in the transaction as the participant record key, set the number of shares owned to zero, set the net contributions to zero, set the transaction value to zero, set the cash death benefit amount to zero, and set the guaranteed income at age 65 to zero and create a new participant record.

Since a single plan provider may work with several independent record keepers, the annuity platform will additionally be able to distinguish between each individual record keeper. One method of making a distinction between multiple record keepers interfacing with a single annuity platform is to utilize a unique ID assigned to each record keeper. The record keepers' IDs may be stored on each platform, although it is conceivable that some platforms (e.g. record keeper's platform) will not store such IDs and are provided the ID by another platform before initiating a transaction.

Additionally, the plan provider may choose to designate an ID to be used by the annuity platform to distinguish among record keepers. Furthermore, it may be beneficial for the plan provider to supply an ID to the annuity platform in order to distinguish among data provided by several record keepers, while maintaining another unique ID in its own database corresponding to each record keeper.

The record keeper's ID may not be stored within the record keeper's platform, but instead be stored by the plan provider's internal platform and be passed on to the record keeper's platform, to enable communication with the annuity platform, when such a need arises. This would provide an advantage with regards to not only security, but many other purposes that may arise from the implementation of the present invention. For those record keepers who will not store a record keeper's ID, a means of identifying the record keeper by file name or by any other distinguishing mechanism may also be utilized. Any single, or combination of the above identification methods may be used without departing from the spirit of the present invention.

The annuity platform, at least in part, maintains its own records. For each participant and each beneficiary the annuity platform will perform the following procedures: locate and read the year of birth on record, locate and read share price for a participant's year of birth (share prices can be modified and found based on record keeper's ID, plan ID and year of birth). It will also calculate the cash out value for a given participant or beneficiary using a predetermined formula (e.g. cash out value=number of shares owned by participant*[share price*liquidation adjustment factor]) wherein the liquidation adjustment factor may be 96%, calculate guaranteed income at 65 for a given participant using a predetermined formula (e.g. income at 65=Number of Shares Owned*$10), update records for each participant and each beneficiary, create a daily record keeper value record for each participant as well as for each beneficiary and pass back to the record keeper's platform the cash out value.

Where the aforementioned cash out value may be passed back to the record keeper in terms of any or all of the following: record keeping fund units, number of shares owned by a given participant, guaranteed income at age 65, net contributions and any other relevant value.

In order to facilitate convenience in data transfer and processing, the annuity platform may also set up a clearing account 1204 which is described bellow. The clearing account would receive all information sent from the record keeper's platform, process the received information and then pass on the processed results to the annuity platform database. Furthermore, a given plan provider may elect to include the balancing control totals from the clearing account in the daily record keeper value record.

Although the pay out of the Lifetime Income is discussed here in as beginning at 65, any age which is agreed upon by the plan provider and/or participant is acceptable. The plan sponsor may elect to limit the participant from purchasing shares after or before a certain age. Similarly, the plan provider may elect to have no such restrictions.

The indicated share price can additionally be used to determine several significant values for a given individual purchasing such shares. A few examples of values which will, at least partially, be determined by Lifetime Income share price are: number of shares purchased, number of shares surrendered or liquidated, participant cash out value and any other values which may be used to satisfy whatever need may arise from the implementation of the present invention.

In order to maintain a pertinent and accurate assessment of the above listed values, share prices are sent to the annuity platform. The annuity platform will accept and store these updated prices on a daily basis (including a history of daily updates). Share prices can be set by birth year, although any other relevant value can be used instead. Although a daily transmission described above any other type of transfer which will satisfy the functional needs of the present invention may be used.

At any point in time, the number of shares purchased can be determined from a premium allocated to the Lifetime Income plan. Any platform may determine the number of shares purchased by a participant. Some elements which may be used to determine the number of shares purchased are defined as follows:

CSP=Current share price for the participant's year of birth
CumShares=Cumulative number of shares purchased
N=Number of shares purchased
Premium=Premium contributed (payroll contribution or transfer in)
t=The timing (date) of an individual transaction, be it a payroll contribution, a transfer into Lifetime Income, or a transfer out of Lifetime Income. (For example, t represents the latest [most recent] transaction, t−1 represents the second latest transaction, and t=1 represents the first transaction made)
x=Current age of a participant (in years as of the participant's last birthday, or as of January 1$^{st}$ of the current year, depending upon the algorithm selected to calculate age)

One method which can be used to determine the number of shares purchased is the formula: $N_t=Premium_t/CSP_{x,t}$. The outcome of this equation can be rounded to any number of decimal places (i.e. 6 decimal places) which allow for a desired level accuracy of results.

The cumulative number of shares can then be determined as equaling the prior shares plus the new number of shares (i.e. $CumShares_t=CumShares_{t-1}+N_t$).

Furthermore, in the event of transfer from one plan to another, any platform may calculate the number of shares surrendered. Some elements which may be used to determine the number of shares surrendered are defined as follows:

CSP=Current share price for the participant's year of birth
CumShares=Cumulative number of shares purchased
Fee=Fee income to plan provider resulting from a transfer out
MaxTV=Maximum cash out value at time t
N=Number of shares purchased
Nsurr=Number of shares surrendered
Premium=Premium contributed
t=Represents the timing (date) of an individual transaction—be it a payroll contribution, a transfer into Lifetime Income, or a transfer out of Lifetime Income. (For example, t represents the latest (most recent) transaction, t−1 represents the second latest transaction, and t=1 represents the first transaction made)

TA=Transfer amount requested out of the Lifetime Income plan
x=Current age of participant One method which can be used to determine the number of shares surrendered is the formula: $Nsurr_t=TA_t/(96\%*CSP_{x,t})$. The outcome of this equation can be rounded to any number of decimal places (i.e. 6 decimal places) which allow for a desired level accuracy of results.

If the number of shares to be surrendered is provided, then the transfer amount can be determined as: $TA_t=Nsurr_t*96\%*CSP_{x,t}$. Further, the amount of cumulative shares may then be readjusted by computing: $CumShares_t=CumShares_{t-1}-Nsurr_t$. As a result, the amount of cash out value, may be determined by computing: $MaxTV_t=96\%*CumShares_t*CSP_{x,t}$.

The plan provider may choose to calculate a profit by the formula: $Fee_t=Nsurr_t*CSP_{x,t}-TA_t$. Although a satisfactory level of accuracy may be reached for all of the above calculations by rounding to the nearest 6 decimal places, when calculations are being performed the plan provider may elect to round up higher or lower than 6 decimal places to achieve a desired level of accuracy.

Transfers into and out of the Lifetime Income plan may be allowed at any time. Even though there are no natural restrictions stemming from the implementation of the Lifetime Income plan, the plan provider may elect to prohibit the transfer out of money. Specifically, the plan provider may chose to allow a transfer out transaction only as long as any transfers out are into another investment option within the plan, thus preventing direct withdrawals. In the instance of a transfer of a balance from one plan to another, the plan provider may use the previously mentioned formula (i.e. $N_t=Premium_t/CSP_{x,t}$) to determine the number of shares purchased. Additionally, in the event of such a transfer the cumulative number of shares can be determined using the aforementioned method (i.e. $CumShares_t=CumShares_{t-1}+N_t$).

Additionally, since information related to a given participant may be stored for decades, some information may be lost in the storage and management process. In order to minimize the chances of information being lost, for each transaction received in the daily transaction file from a record keeper, an exact copy of the transaction is saved in a transaction history file. This transaction history is used in the year of birth corrections or any other correction transaction, to recalculate participant values which may be needed (e.g. number of shares owned, guaranteed income at age 65, net contributions etc.). Any suitable archiving method may be used without departing from the spirit of the present invention.

It is understood that any ability discussed above as being possessed by any of the described platforms may also be possessed by any other platform discussed herein.

Furthermore, if such a need arises in a specific implementation of the present invention, any of the abilities described above as being possessed by any of the platforms may be omitted in such an implementation without departing from the spirit of the present invention.

Furthermore, any feature may be added as needed without departing from the spirit of the present invention.

Management of Lifetime Income Shares Trading

The transactions described above and reflected in FIG. 9 are preferably accomplished using data transfer protocols via unique automated data feeds that automatically update the books and records of both the plan administrator (or relevant financial institution) and the lifetime income share provider.

The efficiency of these trading management tools is enhanced by adapting existing, available trading technology tools.

Primarily in conjunction with the recordkeeper calculate model, the present invention contemplates that the trading activity in lifetime income shares is conducted over the trading platforms currently maintained by the National Securities Clearing Corporation ("NSCC"). If appropriate, trades may be made through other comparable alternative or successor trading platforms.

Trading also uses a unique CUSIP-like number, or similar generic identifier to identify the age-based share price (premium) for each distinct annual age cohort. When calendar year pricing is used, a new CUSIP-like number is assigned at the start of each year for the youngest cohort, with the pre-existing cohorts continuing to use the same CUSIP-like number that had been previously assigned. When "attained age" or other methodology is used, individuals would be "reassigned" to a new CUSIP-like number (i.e., cohort) as they advance in age.

The principal advantage of a lifetime income share is that it can be used to mitigate survival risk, or the risk that an individual will outlive his or her assets.

Figure 11:
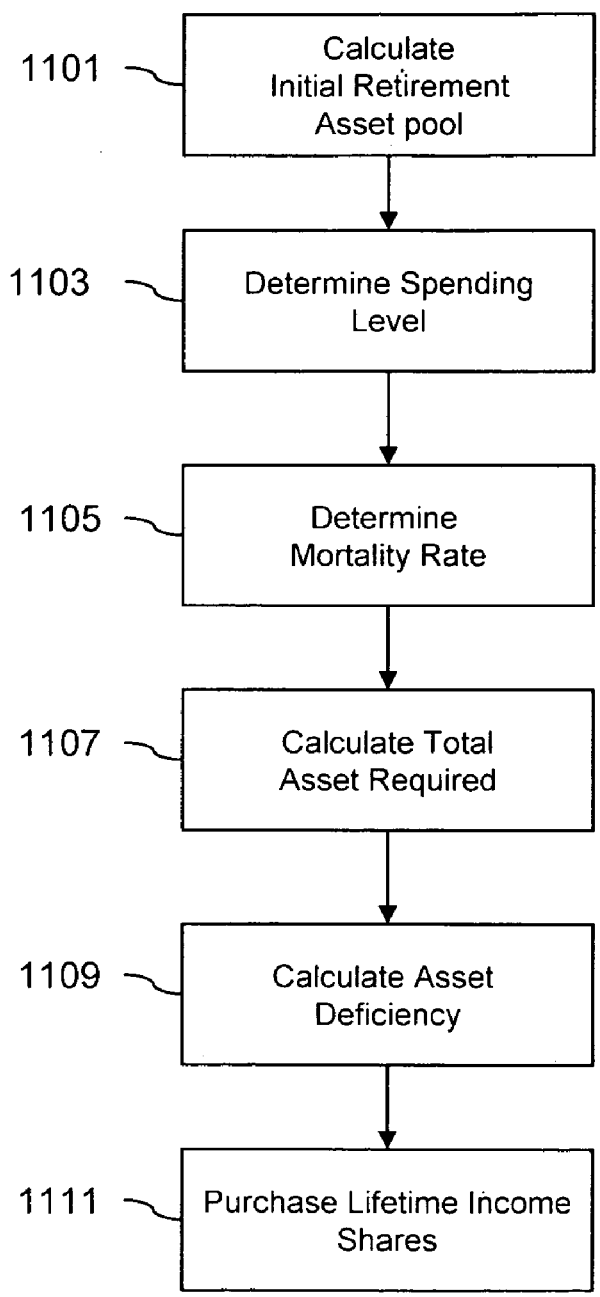
FIG. 11 is a flow chart depicting the sequence of steps of the method for mitigating survival risk in accordance with the preferred embodiment of the present invention.

Referring next to FIG. 11, depicted is as one method of mitigating survival risk utilizing a lifetime income share in accordance with the present invention. Initially, an individual's likely initial retirement asset pool is calculated 1101. This can be done in any well known manner. For example, the asset pool calculation can be accomplished by determining the individual's feasible retirement income level, and calculating the average monthly income available for his or her lifetime after retirement, as well as any deficiency associated therewith. To compensate for any deficiency or to increase his or her monthly income level, and to ensure that the individual does not outlive his or her accumulated liquid assets, it is contemplated that the individual may utilize existing accumulated assets to generate a guaranteed stream of monthly income at a later date. This, in turn, may be utilized to supplement an existing income level or provide income in the event that the individual outlives his or her accumulated liquid assets.

After determining a likely initial retirement asset pool, an individual's periodic spending level 1103 is determined. Typically, this is accomplished by determining an appropriate drawdown rate, which corresponds to the individual's lifestyle. The drawdown rate is utilized to determine an applicable rate of asset depletion based on the same.

Next, an individual's life expectancy is determined 1105. This can be accomplished in any well known way, such as through the use of actuarial mortality tables.

Using the drawdown amount and the life expectancy of an individual, it is possible to calculate the total assets required 1107 for the rest of an individual's life. For example, if an individual is expected to live twenty years, and spends ten thousand dollars a year ($10,000), then the individual needs approximately two hundred thousand dollars ($200,000) for the remainder of his or her life.

After calculating the assets required over the course of an individual's life, the asset deficiency 1109 is calculated by subtracting the initial asset pool from the needed asset amount. If there is a deficiency, there is a risk that the individual will outlive his or her assets. To mitigate this risk, the individual purchases lifetime income shares 1111 in accordance with the present invention. By purchasing the share(s), the purchaser ensures that he or she will receive a monthly payment to supplement his or her asset pool. Because the payments are guaranteed for the purchaser's life, the purchaser cannot outlive his or her assets, even if the initial retirement asset pool is totally depleted.

Figure 16:
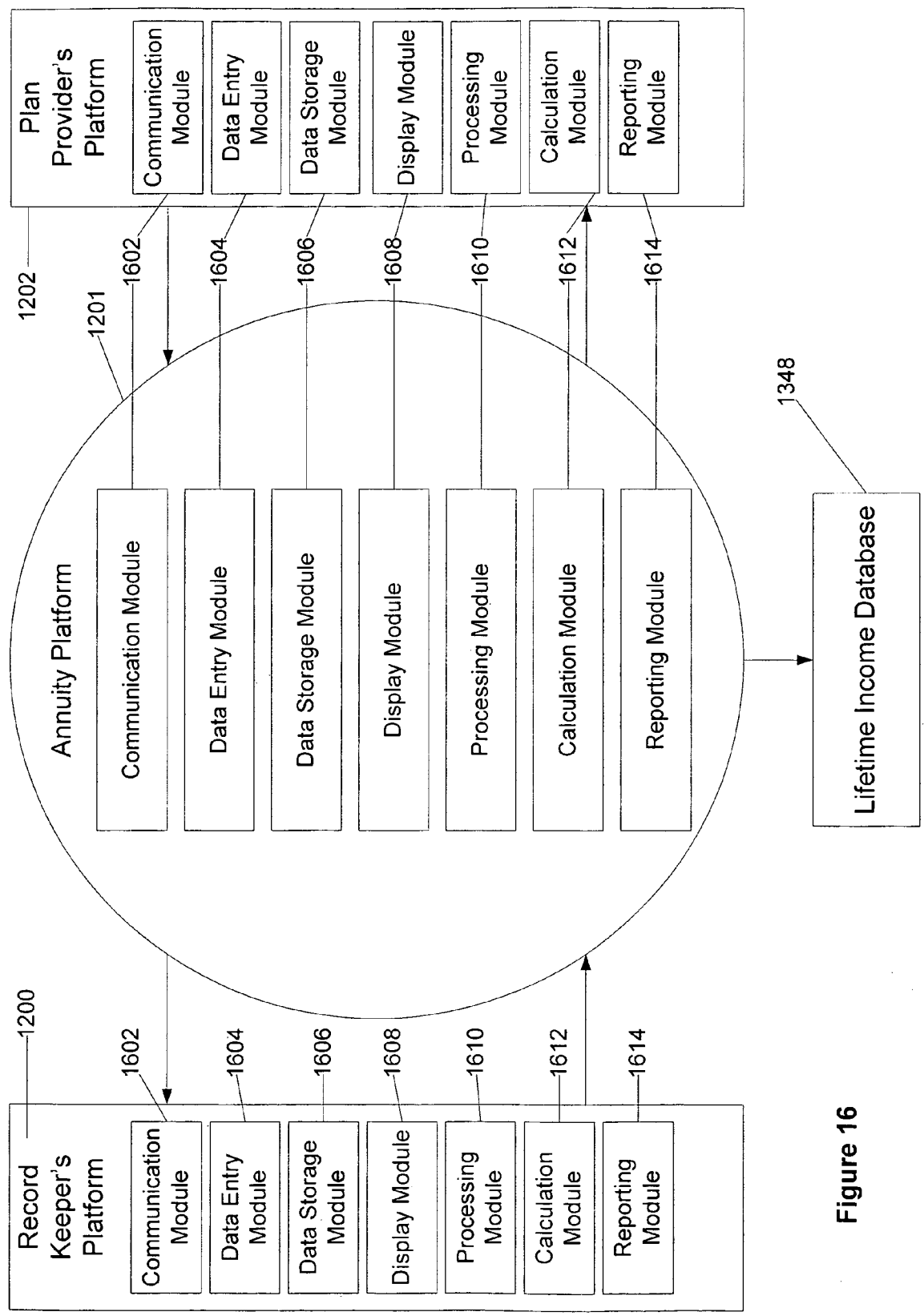
FIG. 16 is a diagram depicting the system on which the methods of the present invention may be implemented in accordance with the annuity platform embodiment of the present invention.

FIG. 16 depicts the system on which the methods of the present invention may be implemented. The system comprises: a record keeper's platform 1200, an annuity platform 1201, a plan provider's platform 1202, and a lifetime income database 1348. Each of the platforms is in communication with the annuity platform 1201 and is comprised of: a communication module 1602, data entry module 1604, a data storage module 1606, a display module 1608, a processing module 1610, a calculation module 1612, and a reporting module 1614. Furthermore, the annuity platform 1201 transmits and receives data, to and from the lifetime income database 1348.

Figure 17:
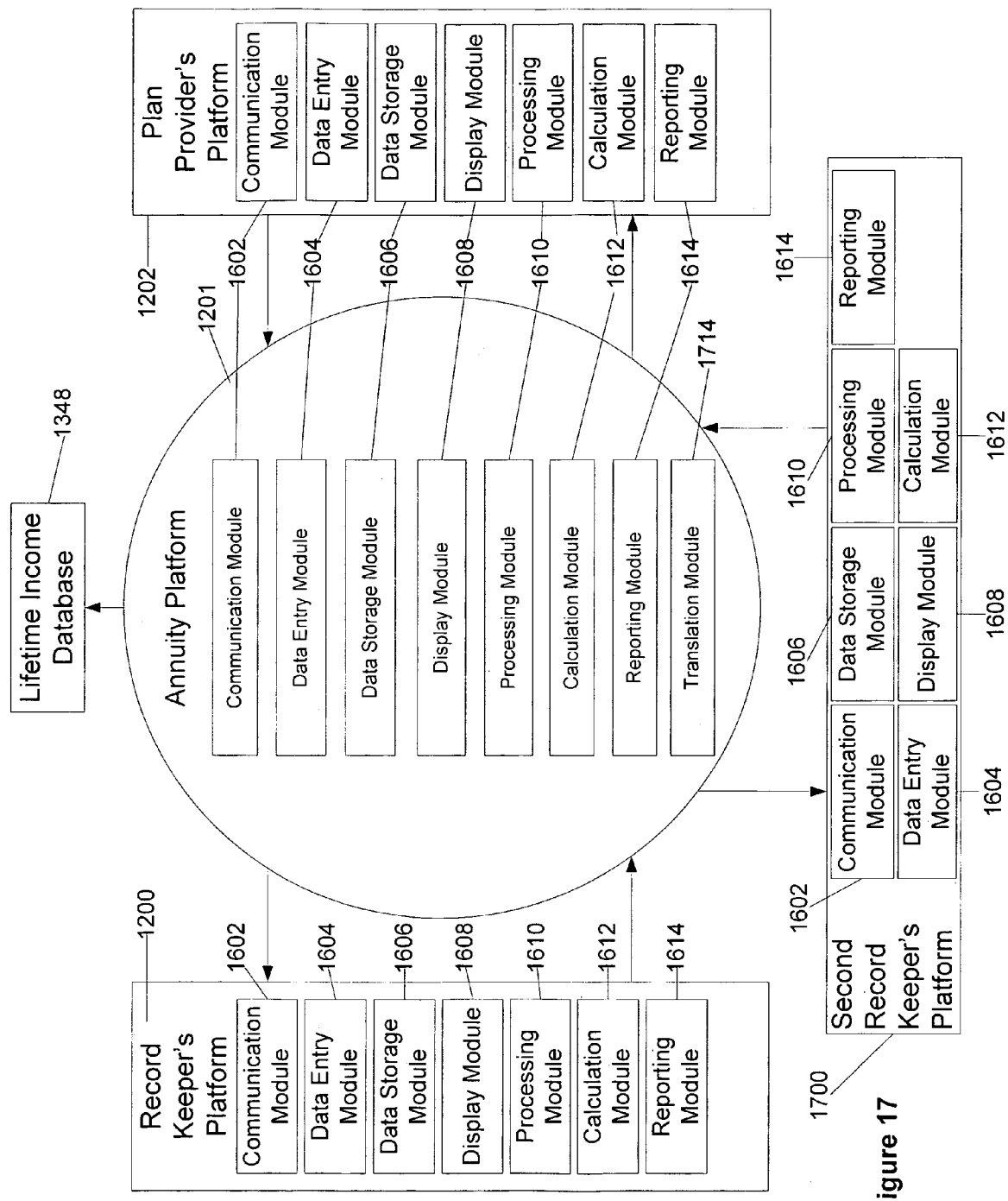
FIG. 17 is a diagram depicting another system on which the methods of the present invention may be implemented in accordance with the annuity platform embodiment of the present invention.

FIG. 17 depicts another system on which the methods of the present invention may be implemented. The system includes a record keeper's platform 1200, a second record keeper's platform 1700, an annuity platform 1201, a plan provider's platform 1202, and a lifetime income database 1348. Each of the platforms is in communication with the annuity platform 1201 and includes a communication module 1602, data entry module 1604, a data storage module 1606, a display module 1608, a processing module 1610, a calculation module 1612, and a reporting module 1614. Furthermore, the annuity platform 1201 transmits and receives data, to and from the lifetime income database 1348.

Additionally, the annuity platform 1201 contains a translation module 1714. The translation module 1714 translates code used by both the record keeper's platform 1200 and the second record keeper's platform 1700 into standard language that is used by the annuity platform 1201.

The following examples highlight some of the benefits of the present invention.

EXAMPLE #1

A male age 50 is contemplating retirement. Between Social Security and a small pension, he already has $2,000 of monthly income. Assume that he also has $500,000 in liquid investments. Also assume that he needs a minimum of $3,500 in monthly income, but would prefer to have $4,500 or $5,000 of monthly income. If he draws down on his investments at the rate of 4% per year, a conservative rate, he can just make his $3,500 minimum. If he draws down on his investments at an 8% rate, he can reach his $5,000 goal. However, at that rate survival risk is very high.

Next, assume that the individual spends $100,000 to buy 147 lifetime income shares that will pay him $1,470 per month once he reaches 65. The individual can then draw down on his remaining $400,000 of investments at the normal 4% rate with the confidence that he will never run out of income. In addition, the supplemental income of the lifetime income shares assures the purchaser of an income very close to his $5,000 a month goal.

EXAMPLE #2

A female age 30 has learned that her company's defined benefit pension plan has been frozen and that she will accrue no further benefits under the plan. She elects to contribute $200 per month to lifetime income, to provide herself with lifetime income in retirement. She uses the illustration tool to project that this will generate extra income in retirement of roughly $1,700 per month, assuming that she continues to contribute at that rate.

When she factors in her anticipated rate of salary increase, the projected income at age 65 increases to over $2,700 per month. When combined with Social Security, she concludes that her lifetime income shares will serve to replace the income her employer's defined benefit plan would have provided.

EXAMPLE #3

A male age 50 contributes $10,000 to lifetime income at age 50, at a price per share of $679.12, purchasing $10,000/$679.12=14.72 shares. He then dies at age 55, and his wife is 56 at the time of his death.

The death benefit payable to the wife is a choice between a cash death benefit and shares of lifetime income. The cash death benefit is a return of net contributions, or $10,000. Alternatively, she can elect to receive a converted number of shares equal to 14.72 shares×(price per share age 55/price per share age 56)=14.72×($899.14/$950.85)=13.92 shares. Therefore, the wife can elect to receive either $10,000 or 13.92 shares of lifetime income. These shares will provider her with $139.20 of monthly lifetime income when she reaches age 65 in just nine years.

EXAMPLE #4

A male makes the following contributions: $10,000 at age 55, $80,000 at age 56, and $50,000 at age 57. He then annuitizes on his $67^{th}$ birthday, with the payout in the form of a 75% Joint & Survivor Cash Refund annuity with his spouse who is age 63 at the time of annuitization.

Total number of shares purchased is $10,000/(price per share at age 55)+$80,000/(price per share at age 56)+$50,000/(price per share at age 57)=$10,000/$899.14+$80,000/$950.85+$50,000/$1005.58=11.1 shares+84.1 shares+49.7 shares=144.9 shares.

The 75% Joint & Survivor with cash refund monthly annuity amount starting at age 67 is equal to the number of shares owned times $10 per share times 1.1334 (the late retirement factor for age 67) times 0.9159 (the 75% Joint and survivor factor for a participant age 67 and a spouse age 63)=144.9×$10×1.1334×0.9159=$1504.20.

While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A method for administering an income share plan having an accumulation phase and a deferment/disbursement of benefits phase, the method comprising the steps of:

administering the accumulation phase by a record keeper platform having a processor and a memory, the record keeper platform maintaining data comprising data relating to an account of a plan participant and data indicative of a number of lifetime income shares purchased by the plan participant through multiple contributions, each of said lifetime income shares being a unit of guaranteed lifetime income for an individual, each of the units representing an obligation to pay the individual a fixed amount, at fixed intervals commencing at a fixed income start date corresponding to a fixed future age of the individual, the fixed amount being a precise and invariable amount set at the times of the contributions, the data maintained by the record keeper platform further comprising amounts of contributions, fixed income start dates, fixed amounts and fixed intervals; and communicating by the record keeper platform records relating to the lifetime income shares, the records including data indicative of the fixed amounts, the fixed intervals and the fixed income start dates, to an annuity platform having a processor and a memory for administration of the deferment/disbursement of benefits phase.

2. The method of claim 1, further comprising:

providing the plan to the plan participant by a plan provider platform having a processor and a memory, and interfacing the plan provider platform and the record keeper platform using the annuity platform.

3. The method of claim 2 wherein the record keeper platform is administered by a record keeper external to a plan provider that administers the plan provider platform.

4. The method of claim 2 wherein the record keeper platform is administered by a record keeper internal to a plan provider that administers the plan provider platform.

5. The method of claim 2 further comprising the step of displaying web pages based on links from the record keeper platform.

6. The method of claim 5 further comprising the step of using data sent to the web pages to display at least a portion of the plan participant's data or plan data from the annuity platform.

7. The method of claim 2 wherein the step of interfacing further comprises the step of accepting by the annuity platform batch files received from the record keeper platform.

8. The method of claim 2 wherein the step of interfacing further comprises the step of processing, by the annuity platform, batch files received from the record keeper platform.

9. The method of claim 2 wherein the step of interfacing further comprises the step of sending batch files by the annuity platform to the record keeper platform for processing.

10. The method of claim 2 wherein the step of interfacing includes interfacing by the annuity platform with the plan provider platform.

11. The method of claim 10 further including the step of receiving and processing by the annuity platform batch files from the plan provider platform.

12. The method of claim 10 further including the step of sending batch files to the plan provider platform by the annuity platform.

13. The method of claim 2 further comprising the step of storing information sent to the annuity platform.

14. The method of claim 2 further comprising the step of passing a record keeper ID from the annuity platform to the record keeper platform.

15. The method of claim 2 further comprising the step of sending, with a predetermined frequency, a batch file or real time data that contains data from the record keeper platform to the annuity platform.

16. The method of claim 2 further comprising the step of choosing a beneficiary for the plan participant, wherein the beneficiary is entitled to at least a portion of the participant's future income stream in the event of the participant's death.

17. The method of claim 16 further comprising the step of:

processing a beneficiary establishing transaction by the annuity platform including the steps of:

validating that a record of the participant exists;

validating that a record of the beneficiary does not already exist for the participant;

comparing year of birth on the participant's record against year of birth in data related to the beneficiary establishing transaction, and if the year of birth has changed triggering a year of birth correction transaction, and setting date of birth on the participant record equal to date of birth passed on in the transaction data.

18. The method of claim 17 further comprising the steps of:
locating the share price for the participant's year of birth;
locating the share price for the beneficiary's year of birth;
calculating cash death benefit amount;
using a beneficiary ID as the beneficiary record key;
using a record keeper ID as the beneficiary's record key;
using a plan ID as the beneficiary's record key;
setting date of birth on the beneficiary's record as equal to the date of birth passed on in the transaction;
setting the gender on the beneficiary's record as equal to the gender passed on in the transaction;
setting the number of shares owned on the beneficiary's record as equal to an amount of shares determined by annuity platform;
setting cash benefit amount as equal to the calculated cash death benefit amount;
setting the beneficiary net contributions data to zero; and
setting the beneficiary transaction value to zero, setting the beneficiary guaranteed income at age 65 to zero, and creating a new beneficiary record.

19. The method of claim 18 wherein the step of calculating death benefit amount comprises computing the product of the number of shares owned by the participant and the beneficiary's percentage of death benefit as further multiplied by the quotient of the share price for the participant's year of birth by the share price for the beneficiary's year of birth.

20. The method of claim 2 wherein each of the plan provider platform, the record keeper platform and the annuity platform transmit information, and the transmitted information is from a group consisting of at least one of the following: money-in transaction, money-out transaction, notification of the plan participant's death, information used to setup the participant account on the annuity platform, transfers of funds within the participant's plan, amount of Lifetime Income shares purchased, transfers from the plan provider's Lifetime Income option back to the record keeper platform, maximum amount of Lifetime income shares available for transfer, information needed to setup a beneficiary account, notification of the beneficiary's death, any lump sum payment the beneficiary received on a death claim, number of converted Lifetime Income shares the beneficiary received as a death benefit payout, transaction which cause a participant to move from the accumulation phase to the deferment phase.

21. The method of claim 2 wherein the annuity platform updates and stores the participant's information.

22. The method of claim 2 wherein the annuity platform performs a check to see if a participant date of birth in data passed on in a transaction is different from the participant year of birth currently on record in the annuity platform.

23. The method of claim 22 further comprising the step of correcting the year of birth if the date of birth passed on in the transaction is different from the participant year of birth currently on record in the annuity platform, and adjusting the number of shares owned by the participant.

24. The method of claim 2 wherein Lifetime Income share prices are used to determine at least one of the following: number of shares purchased, number of shares surrendered/liquidated, and participant's cash out value.

25. The method of claim 2 wherein all transaction information transferred by any of the platforms is stored as transaction records by the annuity platform.

26. The method of claim 2 further comprising the steps of:
setting up a clearing account by the annuity platform;
processing by the clearing account information received by the annuity platform from the record keeper platform; and
passing the processed information to the annuity platform.

27. The method of claim 2 further comprising the step of:
creating a participant account wherein the step of creating a participant account includes the steps of:
creating a new participant record;
setting date of birth on the participant's record based on received information;
setting the gender on the participant's record;
updating the participant's record;
creating a result history;
performing a check on an amount-in to see if the amount-in is equal to the processed amount; and
generating an error condition if the amount-in is not equal to the processed amount.

28. The method of claim 27 further comprising the steps of:
receiving information related to either a money-in transaction or a money out transaction;
checking whether the participant's record exists;
generating an error condition if the participant's record does not exist;
comparing the year of birth on the participant's record against the year of birth on the transaction; and
processing a year of birth correction transaction and setting the date of birth on the participant's record equal to the date of birth passed on in the transaction if the year of birth has changed.

29. The method of claim 28 further comprising the steps of:
setting the gender on the participant's record equal to the gender passed on in the transaction;
calculating the participant's age by computing the difference between the year in the transaction date and the year of the participant's birth on transaction;
locating the share price information for the participant's year of birth;
calculating the number of shares purchased;
calculating the number of shares surrendered or liquidated;
calculating the net contributions for the participant, calculating the number of shares owned; and
updating the participant's record.

30. The method of claim 2 further comprising the step of processing a death notification transaction in the event of the participant's death wherein the processing is handled by the annuity platform, the record keeper platform, or the plan provider platform.

31. The method of claim 30 wherein the processing of the death notification transaction comprises the steps of:
validating that the participant's record exists;
comparing the year of birth on the participant's record against the year of birth on the death notification transaction;
triggering a year of birth correction transaction if the year of birth has changed; and
setting the date of birth on a participant's record equal to the date of birth passed on in the transaction if the date of birth has changed.

32. The method of claim 31 wherein the processing of the death notification transaction further comprises the steps of:

setting the date of death notification on the participant's record equal to the date passed on in the step of death notification transaction; and setting the gender on the participant's record equal to the gender passed on in the transaction and updating the participant's record.

33. The method of claim 2 further comprising the step of:
transmitting an error correction transaction to the annuity platform if an error is detected by any platform, wherein the error correction transaction reverses and reapplies transactions to be corrected.

34. The method of claim 2 further comprising the annuity platform performing for each of the participants the steps of:
locating and reading the year of birth on record;
locating and reading share price for the participant's year of birth;
calculating the cash out value for the participant;
calculating guaranteed income at 65;
updating records for the participant;
creating a daily record keeper value record; and
passing back to the record keeper platform the cash out value for each participant.

35. The method of claim 16 further comprising the annuity platform performing for each of the beneficiaries the steps of:
locating and reading the year of birth on record;
locating and reading a share price for the beneficiary's year of birth;
calculating the cash out value for the beneficiary;
updating the records for the beneficiary;
calculating guaranteed income at 65; and
creating a daily record keeper value record and passing back to the record keeper platform the cash out value for each beneficiary.

36. The method of claim 34 wherein the cash out value for the participant is determined by computing:
cash out value =number of shares owned by participant * [share price * liquidation adjustment factor].

37. The method of claim 34 wherein the guaranteed income at 65 for the participant is determined by computing: Number of Shares Owned * $10.

38. The method of claim 35 wherein the cash out value for the beneficiary is determined by computing:
cash out value =number of shares owned * [share price * liquidation adjustment factor].

39. The method of claim 35 wherein the guaranteed income at 65 for the beneficiary is determined by computing: Number of Shares Owned * $10.

40. The method of claim 12 wherein the batch files contain any of the information chosen from the group of: plan ID, plan type code, the participant's ID, the participant's date of birth, the participant's gender, the participant's state of residence, number of shares owned by the participant, current death benefits on the participant's account, total contributions made by the participant, total money-out transactions and total death benefit paid to date.

41. The method of claim 2 further comprising accessing the annuity platform in real-time.

42. The method of claim 2 further comprising accessing the annuity platform from external applications.

43. The method of claim 2 wherein the annuity platform is capable of interfacing with multiple independent external platforms.

44. A method for administering an income share plan, the method comprising the steps of:
during an accumulation phase of the plan, receiving, by an annuity platform having a processor and a memory, data relating to a plan participant, an account of the plan participant, and purchases by the plan participant of lifetime income shares through a plurality of contributions, each of said lifetime income shares being a unit of guaranteed lifetime income for an individual, each of the units representing an obligation to pay the individual a fixed amount, at fixed intervals commencing at a fixed income start date corresponding to a fixed future age of the individual, the fixed amount being a precise and invariable amount set at the times of the contributions; and maintaining records relating to the purchased lifetime income shares by the annuity platform during the accumulation phase;

wherein the annuity platform is configured to administer disbursements relating to the lifetime income shares by storing data relating to the lifetime income shares, the stored data including data indicative of the fixed amounts, the fixed intervals and the fixed income start dates.

45. The method of claim 44, further comprising:
interfacing a plan provider platform having a processor and a memory and records relating to the plan using the annuity platform.

46. The method of claim 45 further comprising the steps of:
setting up a clearing account by the annuity platform;
processing by the clearing account information received by the annuity platform from the plan provider platform; and
passing the processed information to the annuity platform.

47. The method of claim 45 further comprising the annuity platform performing for each of the participants the steps of:
locating and reading the year of birth on record;
locating and reading share price for the participant's year of birth;
calculating the cash out value for the participant;
calculating guaranteed income at 65; and
updating records for the participant.

48. The method of claim 44, wherein the annuity platform is further configured to administer a deferment/disbursement of benefits phase of the income share plan.

49. A method for administering an income share plan that provides a future income stream, the method comprising the steps of:
during an accumulation phase of the plan, keeping records relating to the income share plan by a record keeper platform having a processor and a memory, the records including data relating to an account of a plan participant and data indicative of purchases by the plan participant of lifetime income shares through a plurality of contributions to the plan, each of said lifetime income shares being a unit of guaranteed lifetime income for an individual, each of the units representing an obligation to pay the individual a fixed amount, at fixed intervals commencing at a fixed income start date corresponding to a fixed future age of the individual, the fixed amount being a precise and invariable amount set at the times of the contributions; and
communicating data relating to the lifetime income shares, the communicated data including data indicative of the fixed amounts, the fixed intervals and the fixed income start dates, by the record keeper platform to an annuity platform, the annuity platform having a processor and a memory, for administration of disbursements relating to the lifetime income shares.

50. The method of claim 49, further comprising:
interfacing the record keeper platform and an external platform using the annuity platform;

51. The method of claim 50 further comprising the step of displaying web pages based on information from the record keeper platform.

52. The method of claim 51 further comprising the step of using data sent to the web pages to display at least a portion of the plan participant's data or plan data from the annuity platform.

53. The method of claim 50 wherein the step of interfacing further comprises the step of accepting by the annuity platform batch files received from the record keeper platform.

54. The method of claim 50 wherein the step of interfacing further comprises the step of processing, by the annuity platform, batch files received from the record keeper platform.

55. The method of claim 50 further comprising the step of choosing a beneficiary for the plan participant, wherein the beneficiary is entitled to at least a portion of the participant's periodic income in the event of the participant's death.

56. The method of claim 55 further comprising the step of:
processing a beneficiary establishing transaction by the annuity platform including the steps of:
validating that the participant's record exists;
validating that the beneficiary's record does not already exist for the participant;
comparing year of birth on the participant's record against year of birth on transaction, and if the year of birth has changed triggering a year of birth correction transaction, and setting date of birth on the participant record equal to date of birth passed on in the transaction data.

57. The method of claim 56 further comprising the steps of:
locating the share price for the participant's year of birth;
locating the share price for the beneficiary's year of birth;
calculating cash death benefit amount;
using a beneficiary ID as the beneficiary record key;
using a record keeper ID as the beneficiary's record key;
using a plan ID as the beneficiary's record key;
setting date of birth on the beneficiary's record as equal to the date of birth passed on in the transaction;
setting the gender on the beneficiary's record as equal to the gender passed on in the transaction;
setting the number of shares owned on the beneficiary's record as equal to an amount of shares determined by annuity platform;
setting cash benefit amount as equal to the calculated cash death benefit amount;
setting the beneficiary net contributions data to zero; and
setting the beneficiary transaction value to zero, setting the beneficiary guaranteed income at age 65 to zero, and creating a new beneficiary record.

58. The method of claim 57 wherein the step of calculating cash death benefit amount comprises computing the product of the number of shares owned by the participant and the beneficiary's percentage of death benefit as further multiplied by the quotient of the share price for the participant's year of birth by the share price for the beneficiary's year of birth.

59. The method of claim 50 wherein all transaction information transferred by the record keeper platform is stored as transaction records by the annuity platform.

60. The method of claim 50 further comprising the steps of:
setting up a clearing account by the annuity platform;
processing by the clearing account information received by the annuity platform from the record keeper platform; and
passing the processed information to the annuity platform.

61. The method of claim 50 further comprising the step of processing a death notification transaction in the event of the participant's death wherein the processing is handled by the annuity platform, or the record keeper platform.

62. The method of claim 50 further comprising the annuity platform performing for each of the participants the steps of:
locating and reading the year of birth on record;
locating and reading share price for the participant's year of birth;
calculating the cash out value for the participant;
calculating guaranteed income at 65;
updating records for the participant;
creating a daily record keeper value record; and
passing back to the record keeper platform the cash out value for each participant.

63. The method of claim 62 wherein the cash out value for the participant is determined by computing:
cash out value =number of shares owned by participant * [share price * liquidation adjustment factor].

64. The method of claim 62 wherein the guaranteed income at 65 for the participant is determined by computing: Number of Shares Owned * $10.

65. The method of claim 50 further comprising accessing the annuity platform in real-time.

66. The method of claim 50 further comprising accessing the annuity platform from external applications.

67. The method of claim 50 wherein the annuity platform is capable of interfacing with multiple independent external platforms.

68. The method of claim 49, wherein the communicating data comprises communicating data to the annuity platform for administration of a deferment/disbursement of benefits phase of the income share plan.

* * * * *

UNITED STATES PATENT AND TRADEMARK OFFICE
CERTIFICATE OF CORRECTION

| | | |
|---|---|---|
| PATENT NO. | : 7,840,469 B2 | Page 1 of 1 |
| APPLICATION NO. | : 11/890005 | |
| DATED | : November 23, 2010 | |
| INVENTOR(S) | : Jonathan L. Mercier and Ken A. Mccullum | |

It is certified that error appears in the above-identified patent and that said Letters Patent is hereby corrected as shown below:

On the Title Page, add a heading as follows: --Related U.S. Application Data--
Following the heading, insert a priority claim as follows:
Item --(63) Continuation-in-part of Application No. 11/724,839, filed on Mar. 16, 2007.
    (60) Provisional Application No. 60/785,141, filed on Mar. 23, 2006.--

Signed and Sealed this
Twenty-eighth Day of June, 2011

David J. Kappos
*Director of the United States Patent and Trademark Office*